Figure 1:
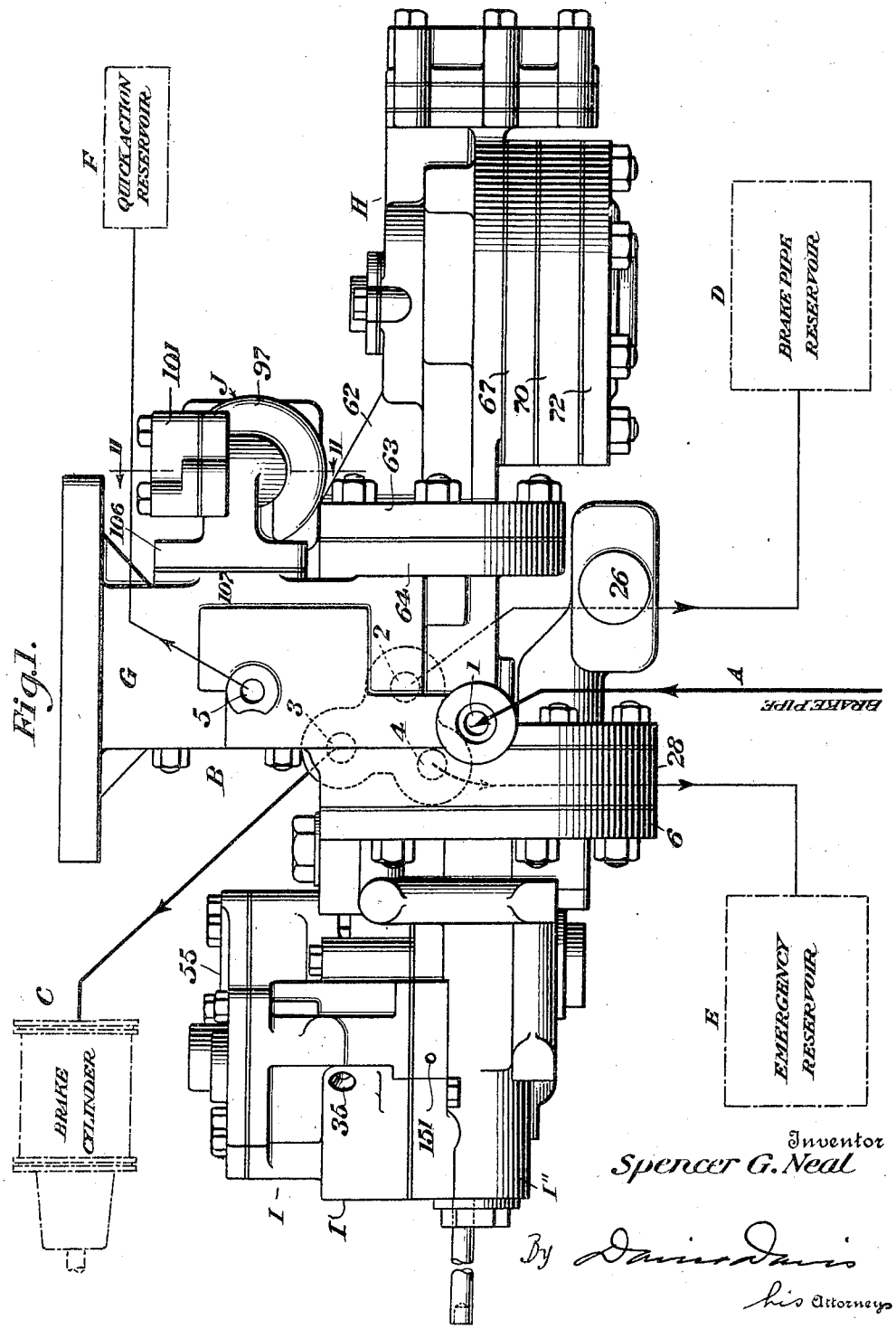

April 29, 1924.

S. G. NEAL

AIR BRAKE APPARATUS 1,492,259

Original Filed Nov. 7, 1921    13 Sheets-Sheet 2

Inventor

Spencer G. Neal

By

Davis Davis his Attorneys

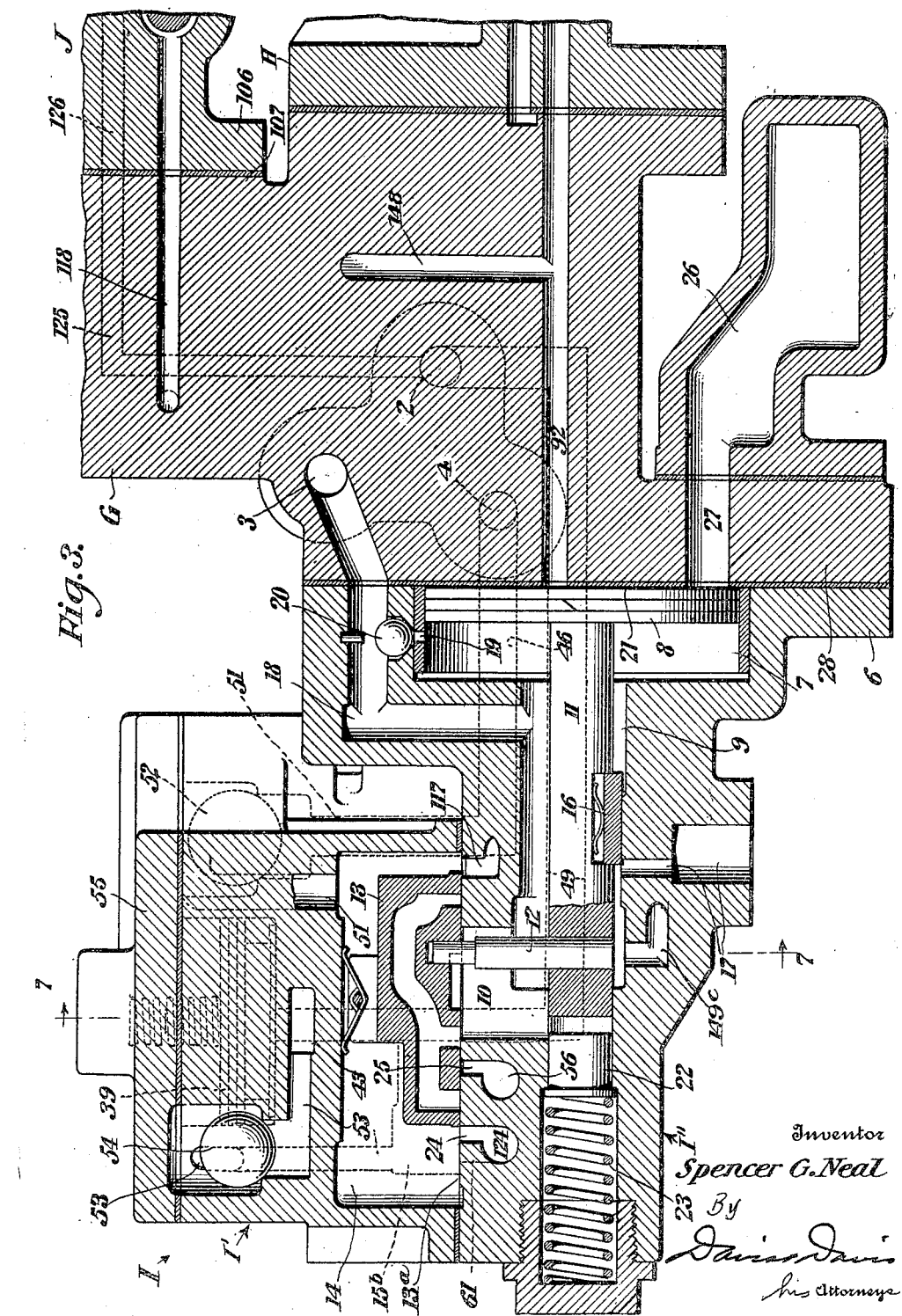

April 29, 1924.
S. G. NEAL
AIR BRAKE APPARATUS
Original Filed Nov. 7, 1921    13 Sheets-Sheet 4
1,492,259
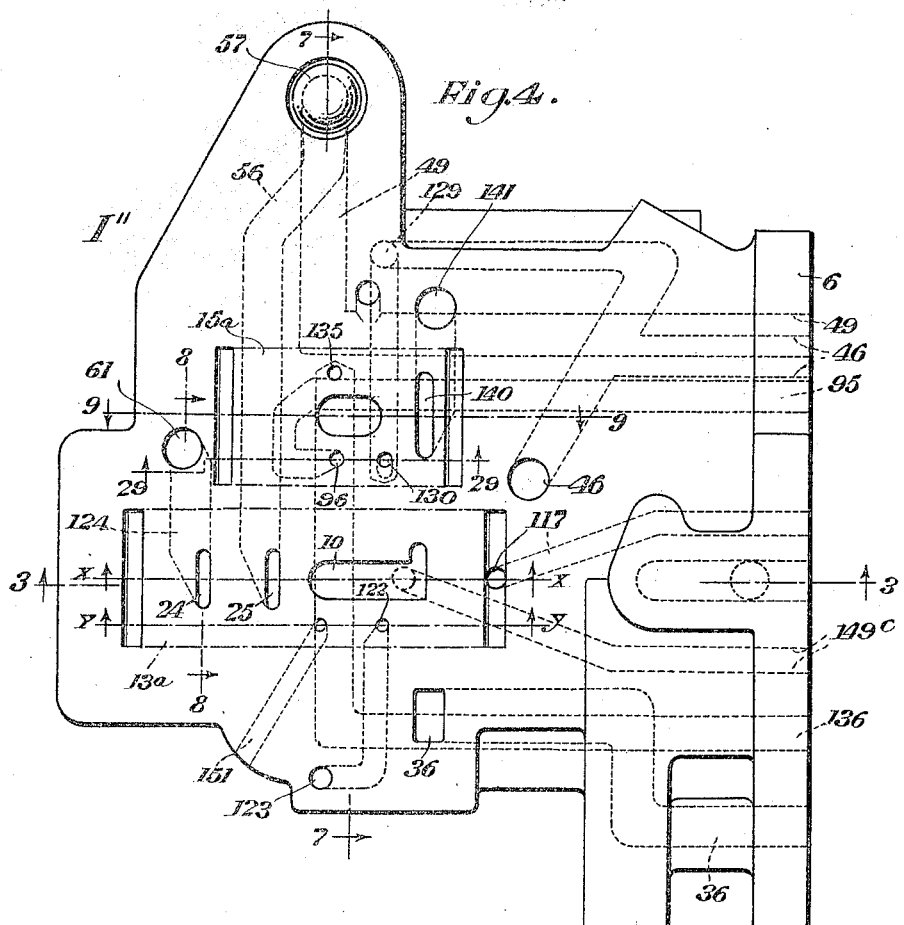
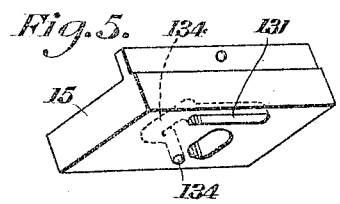
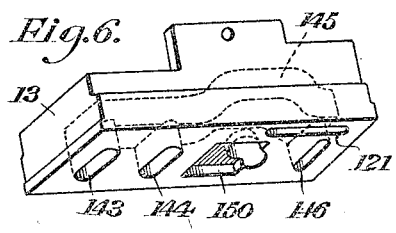
Inventor
Spencer G. Neal
By
his Attorney April 29, 1924. 1,492,259

S. G. NEAL

AIR BRAKE APPARATUS

Original Filed Nov. 7, 1921 13 Sheets-Sheet 5

Inventor
Spencer G. Neal

By his Attorneys

April 29, 1924.  
S. G. NEAL  
AIR BRAKE APPARATUS  
Original Filed Nov. 7, 1921   13 Sheets-Sheet 6

1,492,259

Inventor  
Spencer G. Neal  
By Davis Davis  
his Attorneys

April 29, 1924.
S. G. NEAL
AIR BRAKE APPARATUS
Original Filed Nov. 7, 1921  13 Sheets-Sheet 7
1,492,259
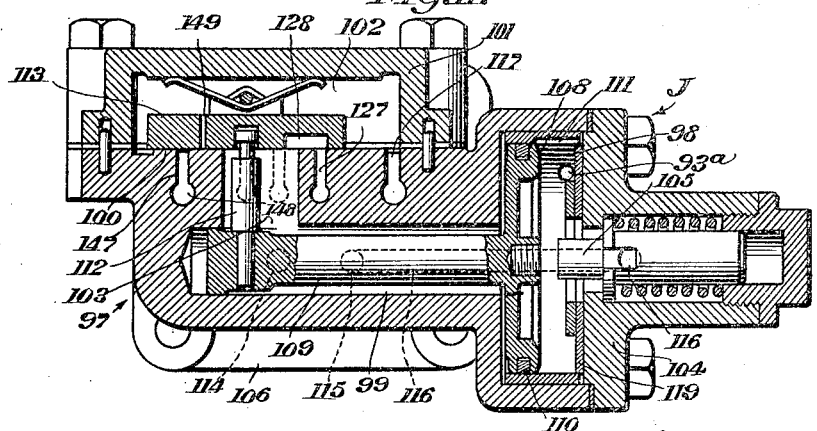
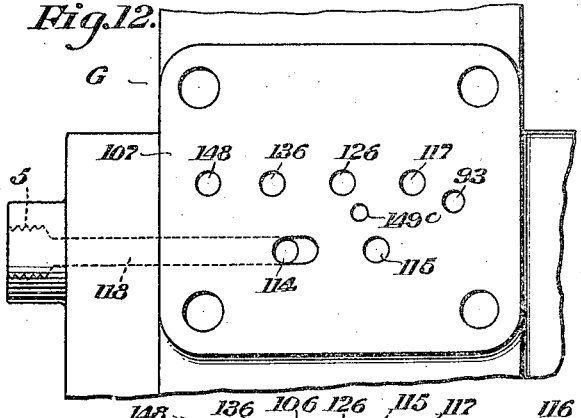
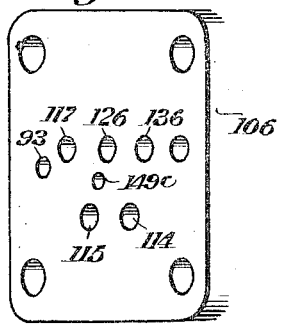
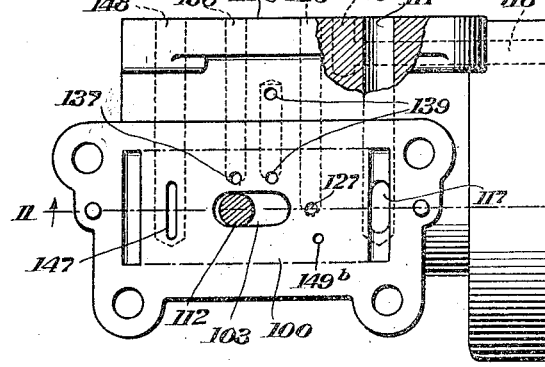
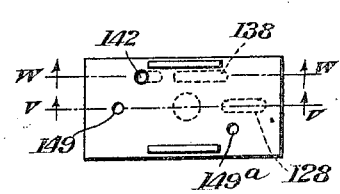
Inventor
Spencer G. Neal
By
Attorneys

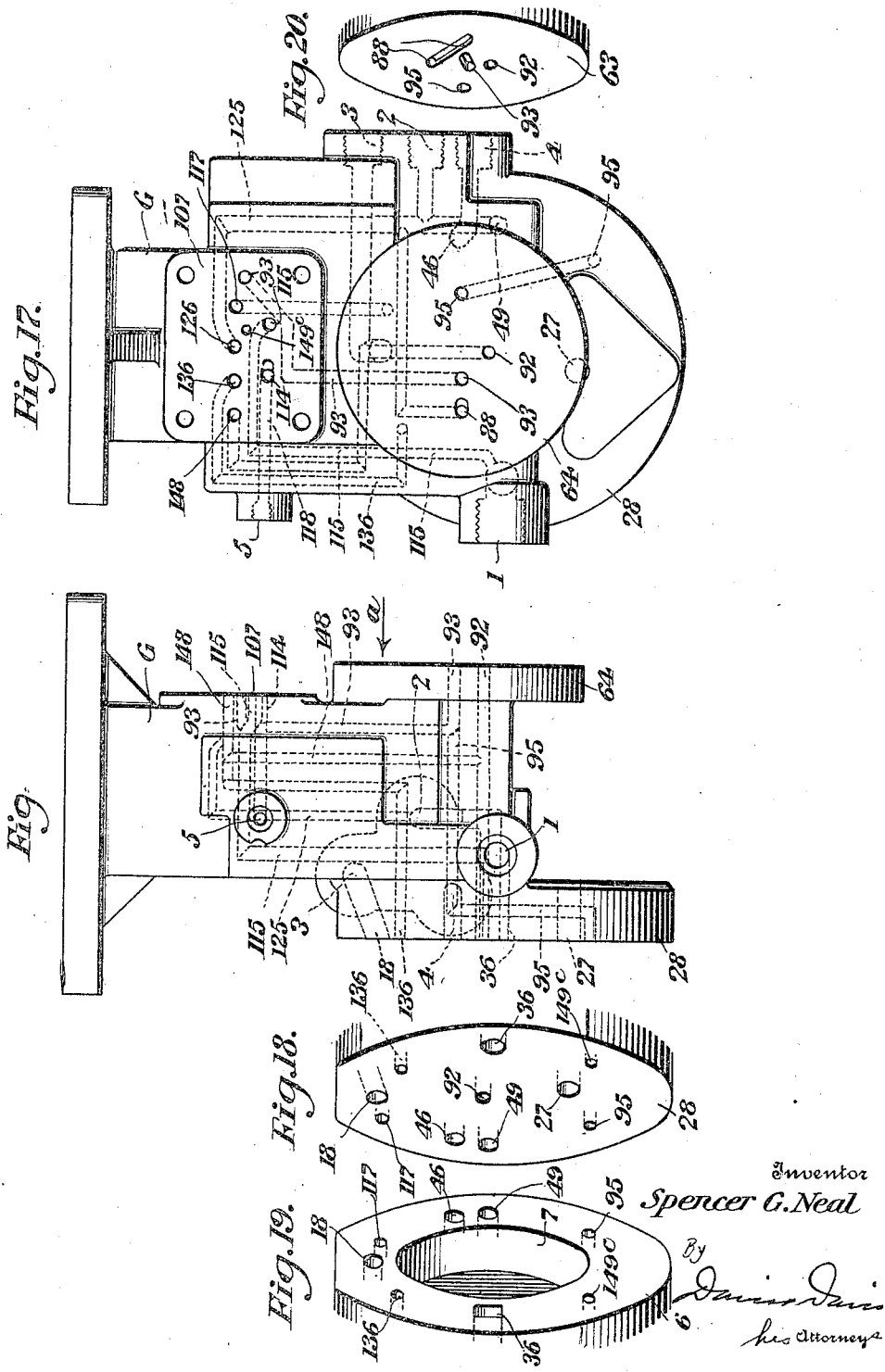

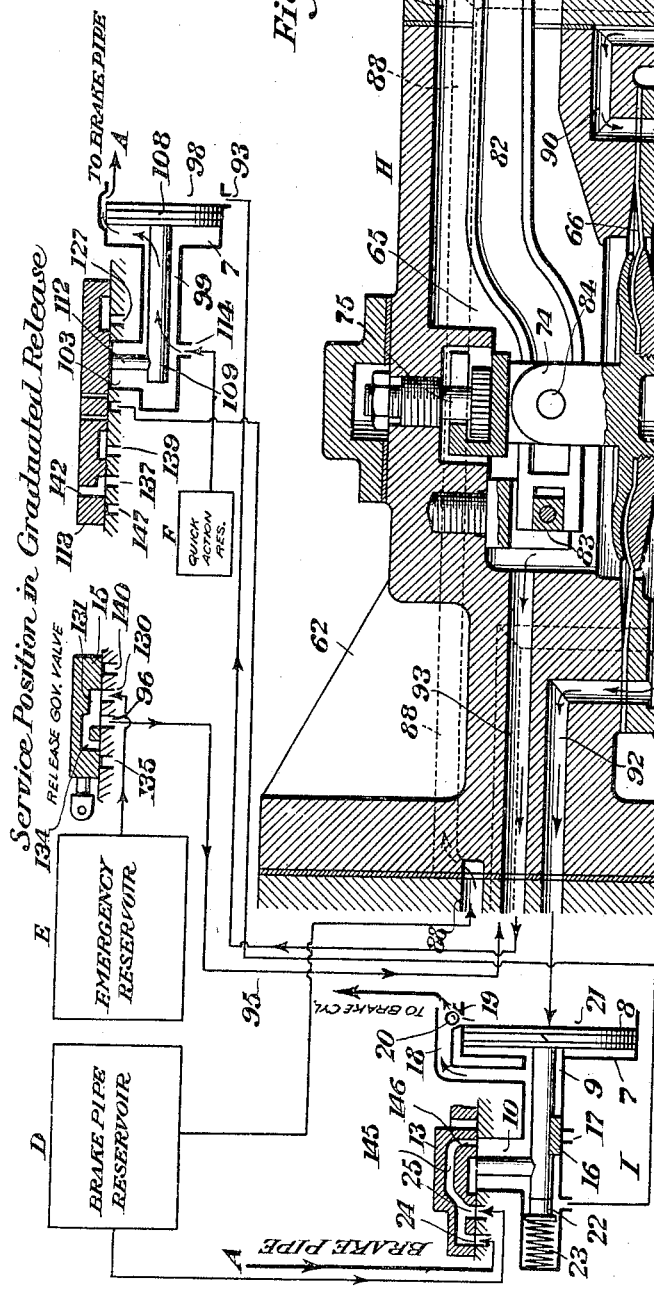

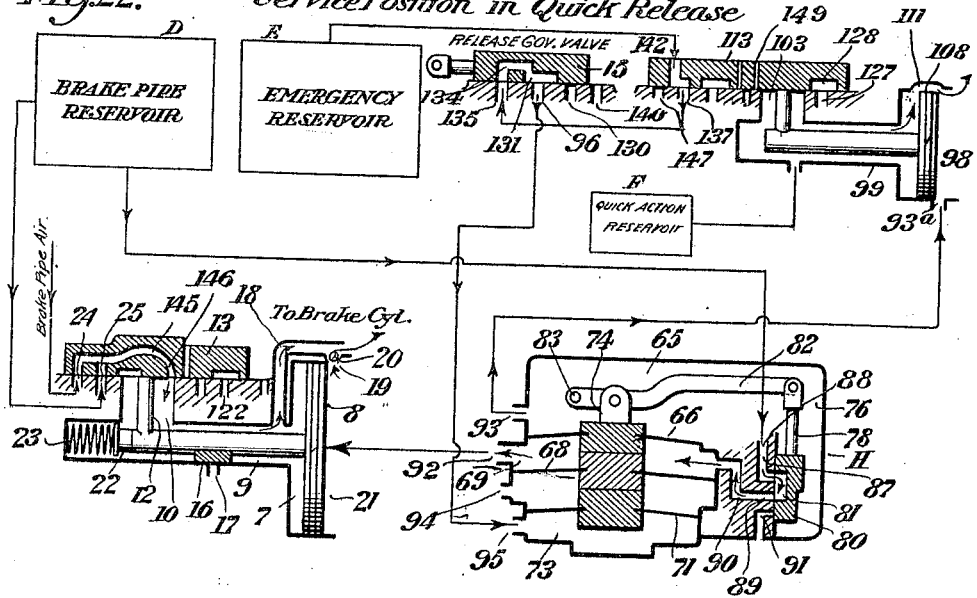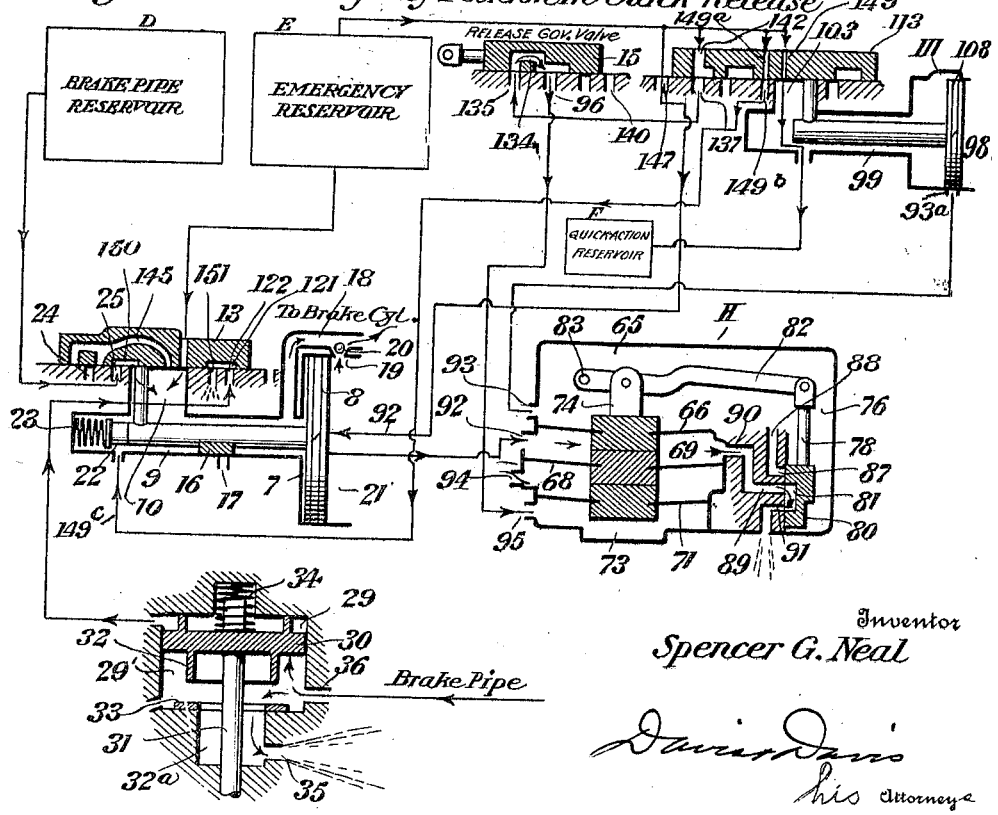

April 29, 1924.   1,492,259
S. G. NEAL
AIR BRAKE APPARATUS
Original Filed Nov. 7, 1921   13 Sheets-Sheet 12
*Main Slide Valve*
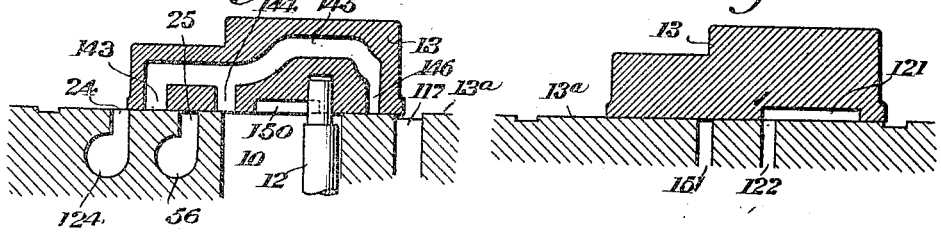
Fig. 25. Release Position   Fig. 25a.
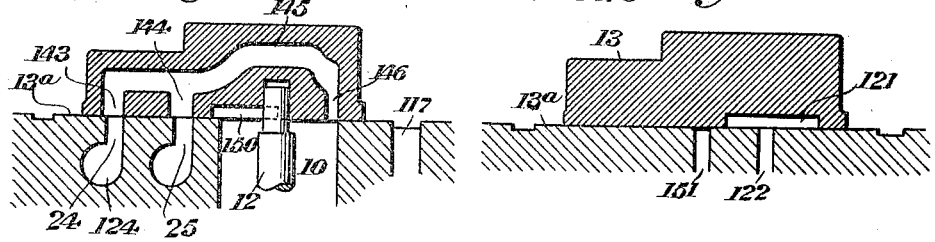
Fig. 26.   Service Position   Fig. 26a.
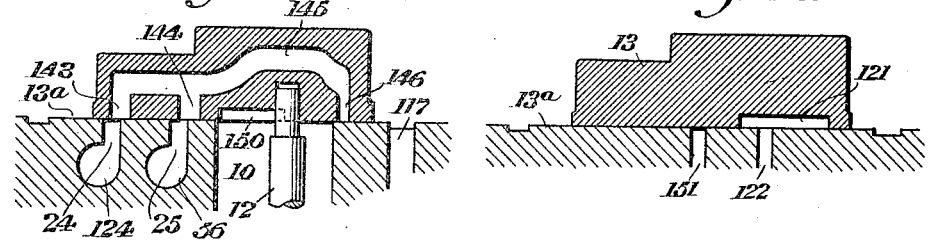
Fig. 27.   Lap Position   Fig. 27a.
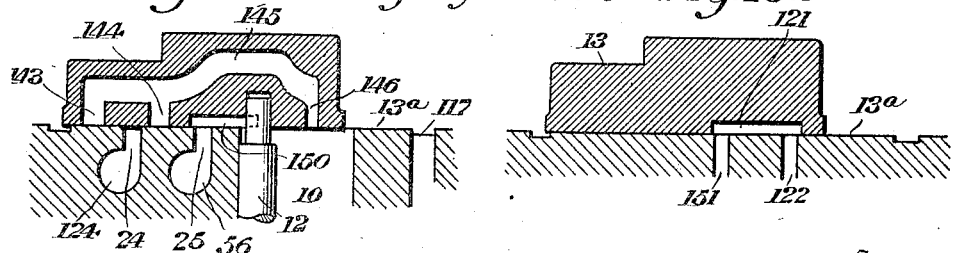
Fig. 28.   Emergency Position   Fig. 28a.
Inventor
Spencer G. Neal
By
his attorneys April 29, 1924.
S. G. NEAL
1,492,259
AIR BRAKE APPARATUS
Original Filed Nov. 7, 1921    13 Sheets-Sheet 13
Release Governing Valve
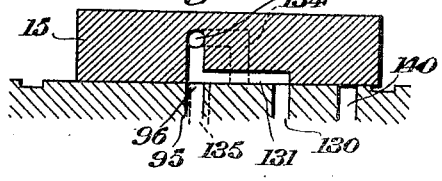
Graduated Release Position
Fig. 29.
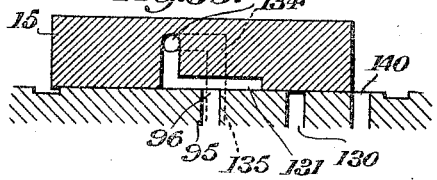
Quick Release Position
Fig. 30.
Emergency Slide Valve
Release Position
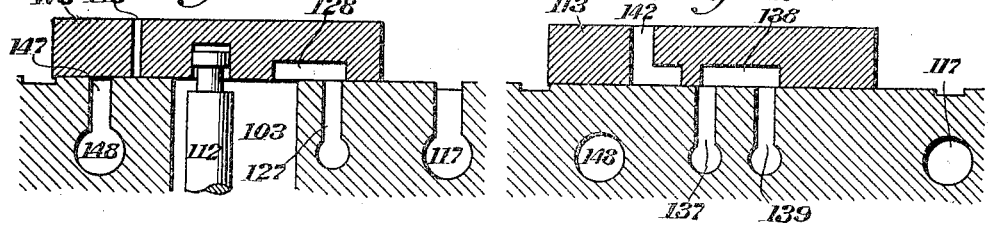
Fig. 31.    Fig. 31.a
Service Position
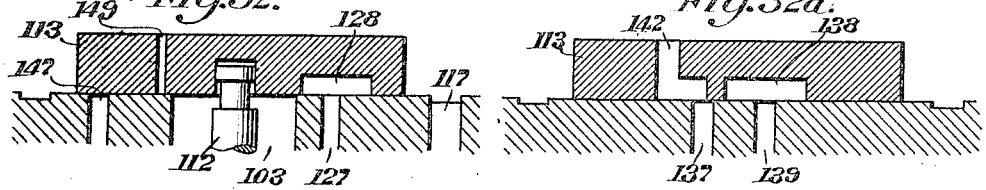
Fig. 32.    Fig. 32a.
Emergency Position
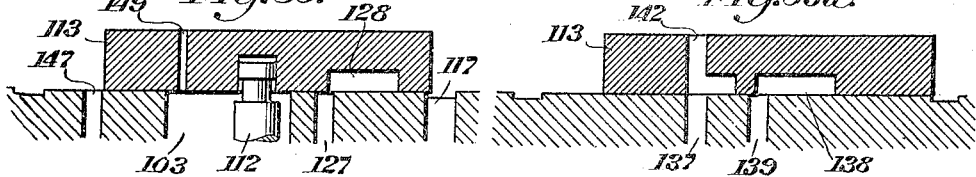
Fig. 33.    Fig. 33a.
Inventor
Spencer G. Neal
By
Attorney Patented Apr. 29, 1924.

1,492,259

UNITED STATES PATENT OFFICE.

SPENCER G. NEAL, OF NEW YORK, N. Y., ASSIGNOR TO AUTOMATIC STRAIGHT AIR BRAKE COMPANY, OF WILMINGTON, DELAWARE, A CORPORATION OF DELAWARE.

AIR-BRAKE APPARATUS.

Application filed November 7, 1921, Serial No. 513,485. Renewed February 18, 1924.

*To all whom it may concern:*

Be it known that I, SPENCER G. NEAL, a citizen of the United States, and residing in the borough of Manhattan, city, county, and State of New York, have invented certain new and useful Improvements in Air-Brake Apparatus (Case 43), of which the following is a specification.

This invention relates to improvements in that type of air brake apparatus, wherein brake pipe and brake pipe reservoir air is used for all service applications of the brakes, an emergency reservoir supplying air for emergency applications of the brakes. In such an apparatus, the brake pipe volume is augmented by the brake pipe reservoir, air from said reservoir passing to the brake cylinder with air from the brake pipe during all service applications of the brakes.

One of the important objects of this invention is to provide a pilot valve mechanism controlling the admission of air to, and the exhaust of air from, a control chamber, said pilot-valve means being governed by brake pipe and emergency reservoir pressures, and the pressure in the control chamber.

Another object of the invention is to provide means in a triple valve governed by brake pipe pressure, emergency reservoir pressure, and the pressure in a control chamber, for establishing a predetermined pressure in the control chamber, the pressure in the control chamber serving to move the main service slide valve to application position and to hold said valve in application position until the brake cylinder pressure equalizes with the pressure in the control chamber.

Another object of the invention is to provide a main service slide valve adapted to connect the brake pipe and the brake pipe reservoir directly to the brake cylinder, the resultant brake cylinder pressure acting directly on the main slide valve piston to move said piston and the main service slide valve to lap position when the desired pressure is in the brake cylinder.

Another object of the invention is to provide a pilot valve to control the pressure in the brake cylinder-control chamber, and an emergency valve to govern the operations of the pilot valve in service applications of the brakes said emergency valve operating to connect the emergency reservoir direct to the control chamber for an emergency application of the brakes.

Figure 2:
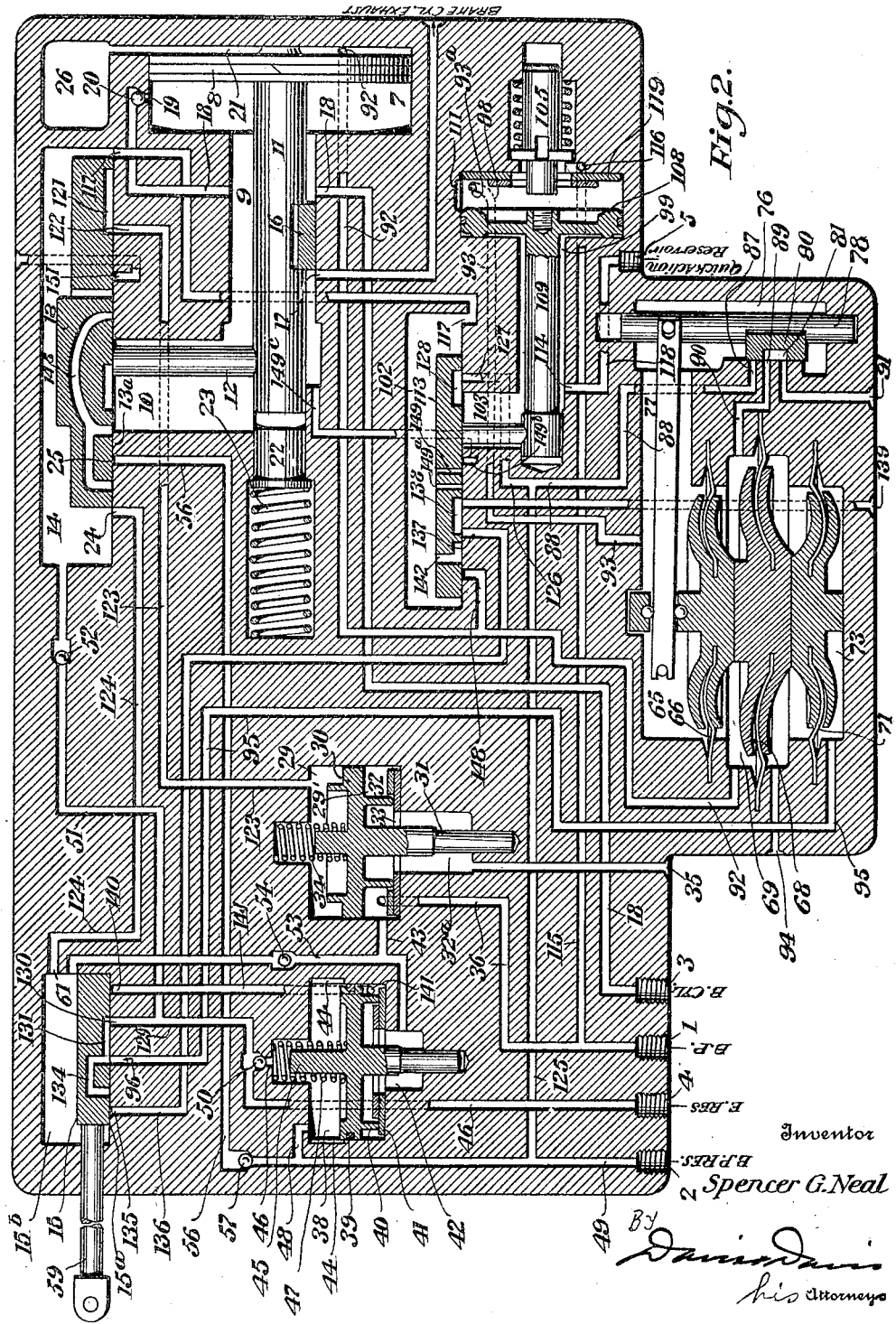
Figure 7:
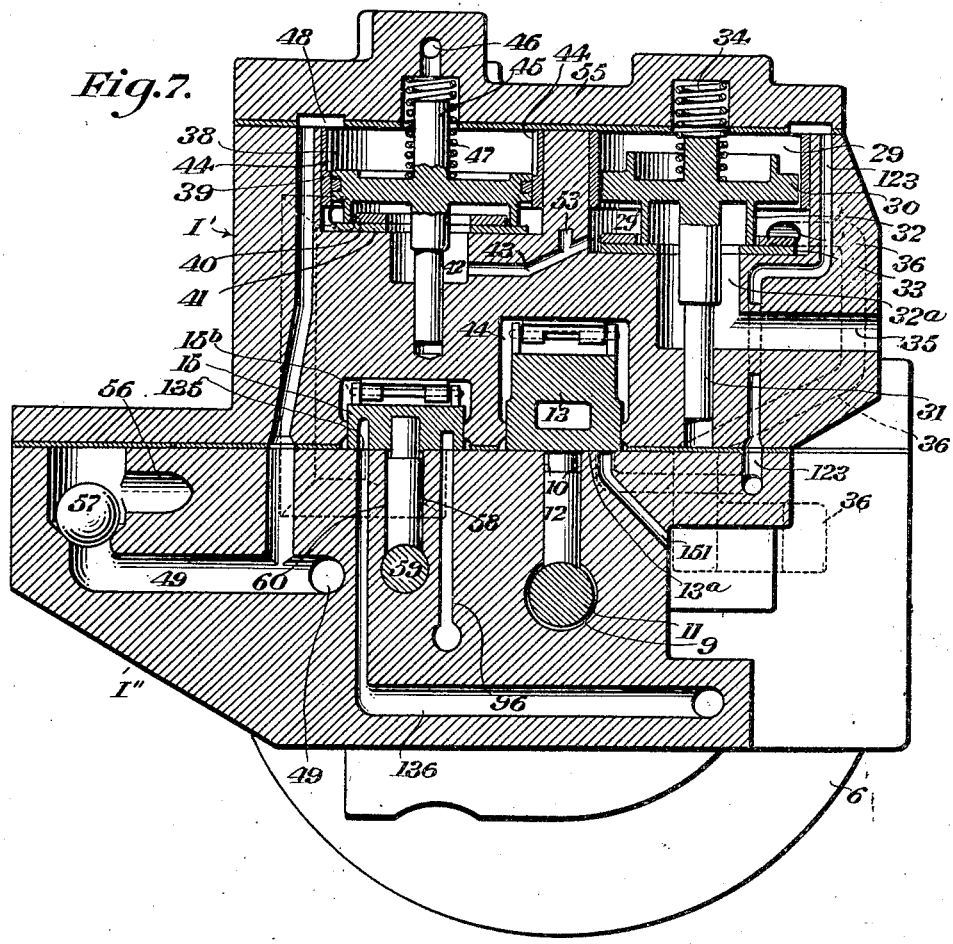
Figure 8:
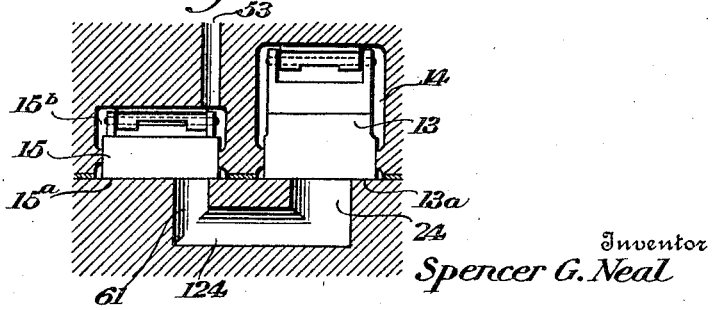
Figure 9:
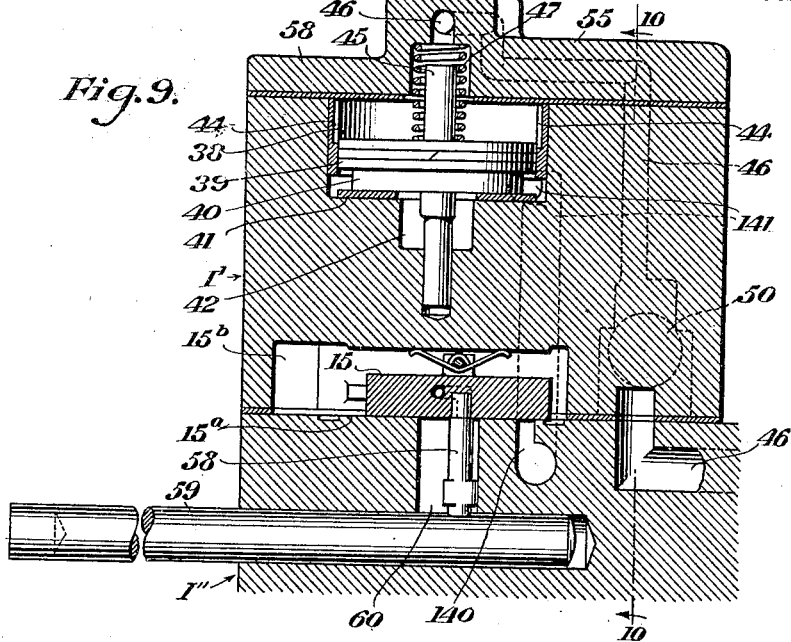
Figure 10:
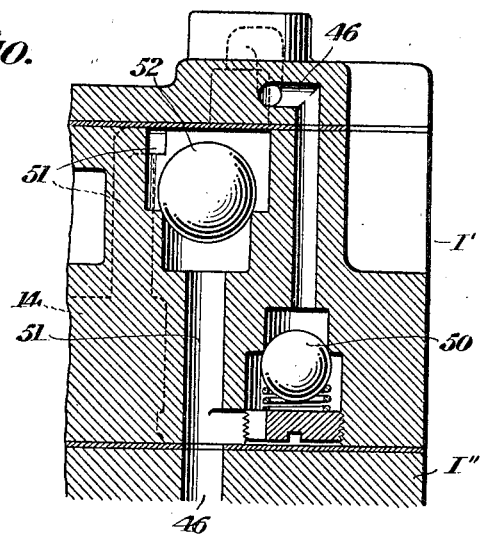
Figure 24:
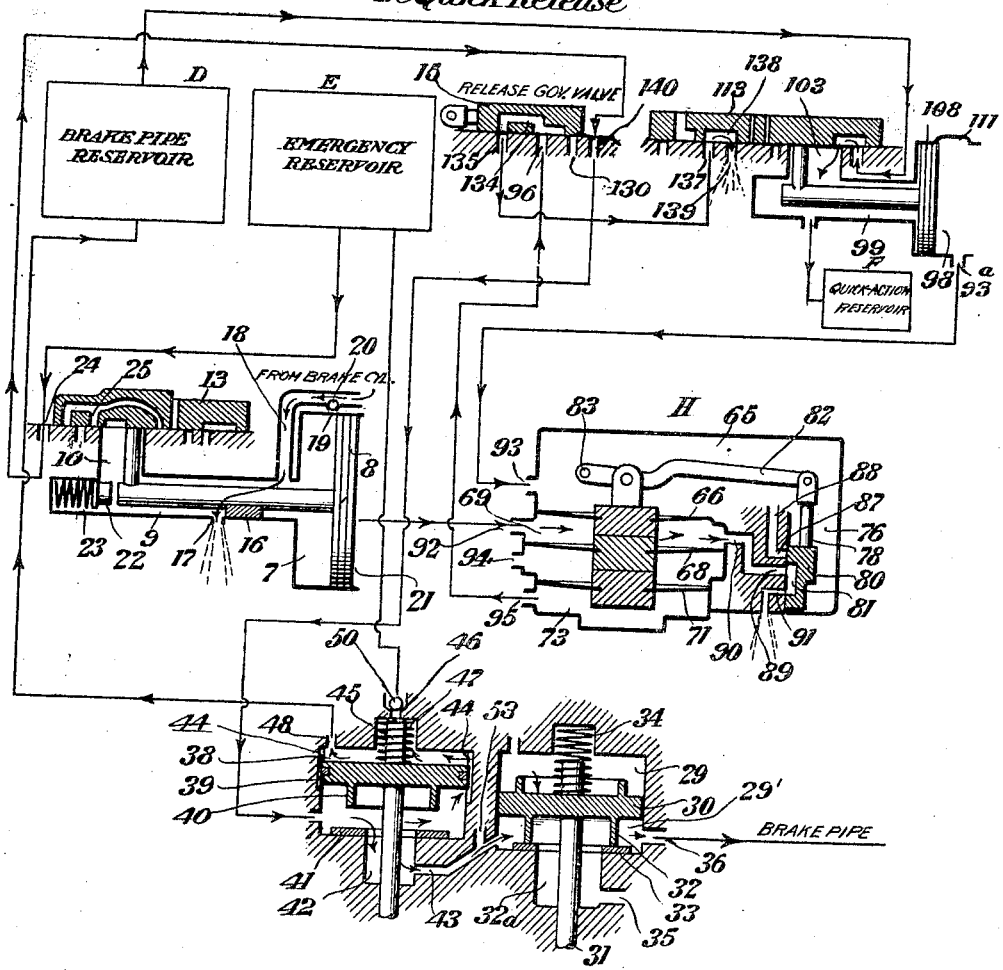

In the drawings, Fig. 1 is a side elevation of the triple valve, the connected brake cylinder and reservoir being shown diagrammatically;

Fig. 2 is a diagrammatic sectional view of the triple valve complete with the parts in charging position and the release-governing valve in graduated-release position;

Fig. 3 a vertical sectional view of the main valve section and the connected part of the supporting bracket, the section being approximately on the line 3—3 of Fig. 4;

Fig. 4 a plan view of the lower part of the main valve body section, showing the main slide valve seat and the release-governing valve seat;

Fig. 5 a detail perspective view of the release-governing valve;

Fig. 6 a detail perspective view of the main slide valve;

Fig. 7 a vertical sectional view of the main valve body section taken approximately on the lines 7—7 of Figs. 3 and 4;

Fig. 8 a detail sectional view taken through the main slide valve and release-governing valve chambers, on the line 8—8 of Fig. 4;

Fig. 9 a sectional view through the main valve section taken on the line 9—9 of Fig. 4;

Fig. 10 a sectional view taken approximately on the line 10—10 of Fig. 9;

Fig. 11 a longitudinal vertical sectional view of the emergency valve section taken on the line 11—11 of Figs. 1 and 14;

Fig. 12 a face view of the emergency valve flange of the main bracket;

Fig. 13 a detail perspective view of the flange of the emergency valve section;

Fig. 14 a plan view of the emergency valve section, with the emergency valve and valve chamber removed, showing the valve seat, a portion of the valve casing being shown in sectional view to more clearly illustrate the ports and passages;

Fig. 15 a top plan view of the emergency slide valve;

Fig. 16 a side elevation of the bracket which supports all of the valve sections;

Fig. 17 an end elevation of the bracket shown in Fig. 16, looking in the direction indicated by the arrow $a$ in Fig. 16;

Fig. 18 a detail perspective view of the bracket flange to which the main valve section is secured;

Fig. 19 a detail perspective view of the flange of the main valve section which is bolted to the bracket flange shown in Fig. 18;

Fig. 20 a detail perspective view of the flange of the pilot valve section which is bolted to the corresponding flange of the main bracket;

Fig. 21 a vertical central sectional view of the pilot-valve section, the other parts of the triple valve being shown diagrammatically, and all of the parts being shown in service position with the release-governing valve in graduated release position;

Fig. 22 a diagrammatic view showing the parts in service position with the release-governing valve in quick-release position;

Fig. 23 a diagrammatic view with the parts in emergency position and the release-governing valve in quick-release position;

Fig. 24 a diagrammatic view with the parts in release position and the release-governing valve in quick-release position;

Figs. 25 and 25ᵃ to Figs. 28 and 28ᵃ inclusive, sectional views of the main slide valve taken on the lines $x$—$x$ and $y$—$y$ respectively, of Fig. 4, showing the main slide valve in release, service, lap, and emergency positions;

Fig. 29 a sectional view of the release-governing valve and its seat taken on the line 29—29 of Fig. 4, showing the release-governing valve in graduated-release position;

Fig. 30 a view similar to Fig. 29, showing the release-governing valve in quick-release position; and Figs. 31 and 31ᵃ to 33 and 33ᵃ inclusive, vertical sectional views of the emergency slide valve and its seat, taken on the lines $v$—$v$ and $w$—$w$ respectively, of Fig. 15, showing the valve in the release, service, and emergency positions.

Referring to the various parts by reference characters, A designates the brake pipe, B the triple valve body, C the brake cylinder, D the brake pipe reservoir, E the emergency reservoir, and F the quick-action reservoir.

In order to simplify the description, the main features of construction will be first generally described in order to locate them in the structure and then the various ports, passages, and valves will be described in detail in connection with the several valve operations.

The triple valve comprises a bracket G, adapted to be secured to the underside of the car body. To this bracket are bolted the pilot valve section H, the main valve casing I, and the emergency valve casing J. All of these sections are provided with suitable flanges which fit corresponding flanges formed on the bracket, the bracket and the various valve sections being provided with suitable cooperating ports and passages. The bracket G is formed with the brake pipe connection 1; the brake pipe reservoir connection 2; the brake cylinder connection 3; and the emergency reservoir connection 4, all of these connections communicating by suitable passages with cooperating ports and passages in the bracket and in the several valve sections. The bracket G is formed also with the quick-action reservoir connection 5, this connection leading through a suitable passage into the emergency valve chamber, as will be fully hereinafter described. The main valve casing I contains the main service slide valve and its piston; the brake pipe reservoir and the emergency reservoir charging valve; the brake pipe vent valve and the release-governing valve. This casing is formed in two sections; the upper section I' and the lower section I'' (see Fig. 3), the upper section containing the valves hereinbefore mentioned, and the lower section containing the main slide valve actuating piston, and the operating rod for the release governing valve. The lower portion of this valve casing is provided with a flange 6 which is bolted directly to a corresponding flange on the bracket G. In this lower section of the valve casing adjacent the bracket G is formed a piston chamber 7, the face of the flange of the bracket G serving to close said piston chamber when the valve casing is bolted in position; and extending inwardly from said piston chamber is a brake cylinder chamber 9. The upper surface of the section I'' of the main valve casing is horizontal, as arranged in the drawings, and on it is formed a seat 13ᵃ for the main slide valve 13 and a seat 15ᵃ for the release governing valve 15, as shown clearly in Fig. 4. A slot 10 is formed in the main slide-valve seat and communicates at its lower end with the brake cylinder chamber 9. Arranged in the chamber 7 is the main piston 8 having a piston rod 11 which extends into the brake cylinder chamber and carries at its inner end an upright post 12. This post extends through the operating slot 10 and is connected at its upper end to the main slide valve 13. The upper section I' of the main valve casing is formed with the main slide valve chamber 14 in which the main slide valve operates, and also with the release governing valve chamber 15ᵇ in which the release governing valve is arranged. Connected to the piston rod 11 is a release valve 16 which controls a brake cylinder release port 17 formed in the bottom of the brake cylinder chamber 9. The brake cylinder chamber 9 is connected by passage 18 to the brake cylinder connection 3 of the bracket G, so that there is always a free and unobstructed communication between the brake cylinder and the brake cylinder chamber 9. The piston chamber 7 is in communication with the brake cylinder passage 18 through a brake cylinder equalizing port 19 which is controlled by a check valve 20, said valve opening toward the passage 18. The port 19 is so located that when the piston 8 is moved inwardly to service position, that is, toward the left hand, as viewed in Fig. 3, the port 19 will be cut off from communication with the chamber 7 and placed in communication with a brake cylinder control chamber 21 formed between the piston 8 and the face of the bracket G. The piston rod 11 is adapted to engage the plunger 22 which is pressed inwardly by a lap spring 23.

In the main slide-valve seat is formed a main brake pipe port 24 and a brake pipe reservoir port 25, which are controlled by the main slide valve, and which are connected to the brake pipe and brake pipe reservoir respectively, as will be more fully hereinafter described. The main slide valve is formed with suitable ports and passages which cooperate with ports in the slide valve seat and with the operating slot 10, as will be fully hereinafter pointed out in connection with the description of the several operations of the main slide valve. Connected to the brake cylinder control chamber 21 is a volume chamber 26, said chamber being connected to chamber 21 by a passage 27 through the flange 28 of the bracket G. The volume chamber is formed in a separate casting bolted to the flange 28 in such manner that it may be readily removed should it be desired to vary the size of said volume chamber. The purpose of this volume chamber is to determine the period of release of the brake cylinder pressure, as will be more fully hereinafter described.

In the upper section I' (Fig. 7) of the main valve casing is formed a brake pipe vent valve chamber, in which is arranged a brake pipe vent valve 30. This valve is in the form of a piston adapted to move vertically in its chamber, being guided by a depending central stem 31 which reciprocates in a suitable guide-opening formed in the casing. The piston 30 divides the brake pipe vent valve chamber into an upper part 29 and a lower part 29'. The piston valve 30 is formed with a depending annular sealing flange 32 which is adapted to engage a gasket 33 on the bottom of the valve chamber for the purpose of closing the brake pipe vent. The sealing flange 32 forms an interior chamber 32ª, which is vented directly to atmosphere by an exhaust port 35. The brake pipe is directly connected to the chamber 29', below the piston 30, by a passage 36; and the pressure is equalized above and below the piston 30 by leakage around the piston. This prevents movement of the piston except in emergency applications of the brakes. The sealing flange 32 of the valve 30 is held pressed against the gasket 33 by a spring 34 and also by the preponderance of air pressure above the valve due to the fact that the area of the under side of the valve within the sealing flange 32 is subject only to atmospheric pressure. Upon a sudden reduction in brake pipe pressure, for the purpose of obtaining an emergency application of the brakes, the chamber 29 above the piston 30 will be vented to atmosphere through the main slide valve, to permit the brake pipe pressure in the chamber 29' below the piston to move it upwardly against the tension of the spring 34 and thereby vent the brake pipe through the port 35. This operation and the various ports and passages involved will be more fully hereinafter described.

In the upper section I' of the main valve casing is formed a reservoir charging valve chamber 38. In this chamber is arranged a charging valve 39. This valve is in the form of a piston which fits closely within the valve chamber 38 and is provided with a packing ring to prevent leakage around it. The piston valve is formed with a depending annular sealing flange 40, which is adapted to seat on gasket 41 on the bottom of the valve chamber and to form an interior sealed chamber 42 below the piston. This chamber 42 is in direct communication with the chamber 29' below the piston 30 by passage 43, so that brake pipe air flowing in through passage 36 will enter chamber 42 through the passage 43, (see Fig. 7). In the wall of chamber 38 is formed a series of feed grooves 44. Extending upwardly from the piston 39 is a valve 45 in the form of a stem, which when the piston is elevated, will close an emergency reservoir charging port and passage 46. A spring 47 normally holds the piston in its lowermost position with the flange 40 sealed against the gasket 41. Opening into the valve chamber 38 at the top thereof, is a brake pipe reservoir charging passage 48, said passage leading into the brake pipe reservoir passage 49 formed in the lower section of the main valve casing. A check valve 50 is arranged in the emergency reservoir charging passage 46 to prevent backflow of air through said passage to the chamber 38.

Brake pipe air in the charging operation, as will be more fully hereinafter described, flowing into the chamber 42 will raise the piston 39 and uncover the feed grooves 44. Air will then pass around the piston, through said feed grooves, and into the brake pipe reservoir charging passage 48. When the piston 39 is raised, the valve 45 will seat and close the emergency reservoir charging port and passage 46. When the pressures in the brake pipe and the brake pipe reservoir have equalized, the spring 47 will force the piston 39 downwardly and thereby open the emergency reservoir charging port. The emergency reservoir is connected to the main slide-valve chamber 14 by passage 51 in which is arranged a check valve 52 which permits air to flow into said chamber 14, but prevents it flowing from said chamber to the emergency reservoir (see Figs. 2 and 3). The release governing valve chamber 15$^b$ is connected by passage 53 to the chamber 29' below the piston 30 by means of passage 43. In this passage 53 is arranged a check valve 54 which permits brake pipe air to pass through passage 53 to the chamber 15$^b$, but prevents it passing back to the chamber 29' (see Figs. 2 and 3).

The upper part of the main valve section is provided with a cap plate 55 which serves as a closure for the valve chambers 29 and 38, and in which the necessary registering ports and passages are formed.

Brake pipe reservoir port 25 of the main slide valve seat is connected to the brake pipe reservoir passage 49 by the passage 56, in which passage is a check valve 57 arranged to permit air to flow from the brake pipe reservoir to the port 25, but prevents air flowing from said port back to the brake pipe reservoir. The purpose of this check valve 57 is to permit brake pipe reservoir air to pass into the brake cylinder in emergency applications of the brakes, if the brake cylinder pressure is not in excess of the pressure in brake pipe reservoir.

The release governing valve 15 is connected by a stem 58 to an operating rod 59, which is suitably mounted in the valve casing. The stem 58 extends upwardly through an operating slot 60. The operating rod 59 projects beyond the valve casing and may be connected to any suitable form of operating device. The valve chamber 15$^b$ is considerably larger than the valve 15, and the interior of said chamber is connected directly to the brake pipe port 24 of the main slide valve seat by means of a port 61 and the connected passage. The release governing valve may be manually adjusted to its quick-release position, or to its graduated-release position, by operating the rod 59, all of which will be fully hereinafter described.

The pilot valve section H consists of a main top casting 62 which is provided with a flange 63, adapted to cooperate with a corresponding flange 64, formed on the bracket G on the opposite side thereof from the flange 28. In the main top casting 62 is formed an actuating chamber 65, the lower wall of which is formed by an actuating diaphragm 66. The diaphragm 66 is secured in place by means of a ring 67, said ring also serving as the means for spacing the equalizing diaphragm 68 a suitable distance from the actuating diaphragm in order to form the equalizing chamber 69. The equalizing diaphragm is secured in position by means of a spacing ring 70, which ring also serves as a support for the emergency reservoir diaphragm 71, this latter diaphragm being secured in place by a cap plate 72 which forms an emergency reservoir chamber 73 below the diaphragm 71. These diaphragms are all arranged in axial alignment with central supporting heads which abut together in such a manner that all of the diaphragms move together. The actuating diaphragm is provided with an upwardly extending central post 74, which is formed into a yoke at its upper end to engage over the head of bolt 75. The yoke and the bolt head serve as a means to maintain the series of diaphragms in proper relative position and as a means for limiting the vertical reciprocating movement of the diaphragm.

The equalizing diaphragm 68 is larger in area than the actuating diaphragm 66 and the emergency reservoir diaphragm 71, for a purpose which will fully hereinafter appear. Secured to the casting 62 is the pilot valve chamber 76, the interior of said chamber being in open communication with the actuating chamber 65 through an operating slot 77 in casting 62, and through a valve seat plate 62$^a$. A valve rod 78 is mounted in the valve chamber 76 and is arranged to reciprocate vertically in rigid lugs 79 on valve plate 62$^a$. This valve rod carries a small pilot valve 80 which slides on a valve seat formed on the plate 62$^a$ and is provided with a groove 81 in its face. The upper end of the valve rod is connected to the outer end of a pilot valve lever 82, the inner end of which is pivotally mounted upon a stud 83 in the actuating chamber and said lever is pivotally connected to the stem 74 of the diaphragm structure by means of a horizontal pivot 84. It is manifest, therefore, as the diaphragm structure reciprocates the pilot valve will be moved vertically on its seat.

The valve rod 78 of the pilot valve is provided with a headed pin 78$^a$ to which is connected a rod 85. The lower end of this rod is provided with a head and this head is formed with an open slot which is adapted to receive the pin 78$^a$, the upper end of said rod sliding loosely through the upper bearing 79 of the rod 78. The rod 85 above the said bearing is provided with a stop to limit the downward movement of the rod. Between the head on the lower end of the rod 85 and the upper bearing of the rod 78 is arranged a spring 86. When the pilot valve is moved to application position the spring 86 is compressed against the lug 79 and serves to assist in moving the pilot valve back to lap position when the desired pressure is in the equalizing chamber 69 and the pressures in the pilot valve structure are balanced, as herein described. The rod 85 is so arranged and proportioned that the pilot valve may be moved downwardly to release position without interference.

The pilot valve seat is formed with a port 87 which is in communication with a passage 88 leading to the brake pipe reservoir. The valve seat is also formed with a port 89 which is in communication with the equalizing chamber 69 through a passage 90. An exhaust port 91 leads from the pilot-valve seat directly to atmosphere. The equalizing chamber is directly connected through passage 92 to the brake cylinder control chamber 21 of the main valve section.

The actuating chamber 65 is connected by the passage 93 with the brake pipe through the emergency valve, as will be hereinafter described. The chamber between the equalizing diaphragm 68 and the emergency reservoir diaphragm 71 is permanently vented to atmosphere through passage 94. The emergency reservoir chamber 73 is connected by passage 95 to port 96 in the seat of the release governing valve. Emergency reservoir air will flow to the chamber 73, through the release governing valve, as will be more fully hereinafter described.

The emergency valve comprises a main valve body 97, in which is formed an emergency-piston chamber 98, and a quick-action chamber 99 extending inwardly therefrom. The upper surface of the main valve body is formed into an emergency valve seat 100, which is enclosed by a cap 101 which forms the emergency valve chamber 102. The emergency-valve chamber is connected to the quick-action chamber by an operating slot 103. The emergency piston chamber 98 is closed by a cap plate 104 in which is mounted a spring-pressed plunger 105 which extends into the chamber 98. The main body of the emergency valve is formed with a flange 106, which is adapted to be bolted to a corresponding flange 107 formed on the bracket G. These two flanges have coincident ports which will be more fully hereinafter described.

In the emergency-piston chamber is mounted an emergency piston 108 which carries the inwardly extending stem 109. The piston is provided with a packing ring 110 to prevent leakage of air around it. The wall of the chamber 98 is provided with a leakage groove 111 to permit air passing around the piston when said piston is in its service position. Connected to the inner end of the stem 109 is a vertical post 112 which extends upwardly through the operating slot 103 and is connected to an emergency valve 113. The passage 93 from the actuating chamber 65 enters the emergency piston chamber 98 at port 93ª. The brake pipe is connected by passage 115 to the emergency-piston chamber, through port 116, which port opens into the chamber 98 on the outer side of the piston so that the brake pipe air will tend to force the emergency piston inwardly. The emergency-valve chamber 102 is in direct and permanently open communication through passage 117 with the main slide valve chamber 14, so that emergency reservoir air in chamber 14 will be registered in the emergency-valve chamber 102. The quick-action reservoir F is in direct communication with the quick-action chamber 99 through passage 118. This passage connects with port 114 and is permanently open so that the quick-action reservoir will always be in communication with the quick-action chamber, its purpose being to augment the volume of the quick-action chamber in order to ensure the rapid movement of the emergency piston in emergency operations.

The emergency piston 108 is adapted to seat against a sealing gasket 119 when it moves outwardly to emergency position. This is to prevent leakage of air from the chamber 99 around said piston in emergency applications.

It will be understood that the usual variations in brake pipe pressure, to effect the operations of the triple valve are secured through the manipulation of the engineer's brake valve.

*Charging system—Graduated release.*

(See Figs. 2, 3, 25, 25ª, 29, 31 and 31ª).

In charging the system, brake pipe pressure is raised in the usual manner. Air flows from the brake pipe A, through the brake pipe connection 1 of the bracket G. From this connection the brake pipe air will flow through passage 36 to the chamber 29' below the emergency vent valve 30, thence through passage 43 into chamber 42 below the charging valve 39 and will raise said valve to uncover the lower ends of the charging grooves 44 and to cause the valve 45 to close the emergency reservoir charging port 46. Air will then flow around the valve 39 and into the brake pipe reservoir charging port and passage 48 and thence through passage 49 into the brake pipe reservoir. Air will continue to flow to the brake pipe reservoir until there is a substantial equalization of pressures in said reservoir and the brake pipe, at which time the spring 47 will partly lower the charging valve 39 and open communication between the emergency reservoir port 46 and the chamber 38 and the brake pipe reservoir, thus permitting air to flow from the chamber 38 to the emergency reservoir past check valve 50. So long as the pressure in chamber 38 is below brake pipe pressure, the charging valve will remain partly raised and air will flow through the feed grooves 44 until there is a substantial equalization of pressures. This charging operation and the feed of air around the charging valve will continuue until the emergency reservoir pressure has been built up to a substantial equalization with the brake pipe and the brake pipe reservoir. When this has taken place the spring 47 will force the charging valve downwardly and cause its flange 40 to seat on the gasket 41 and cut off the brake pipe and chamber 42 from the feed grooves 44.

The purpose of this charging valve is to prevent overcharging the emergency reservoir. The emergency reservoir cannot receive air until the brake pipe reservoir has been charged to an equalization with the brake pipe. The charging valve 39 serves as an automatic compensator to maintain the brake pipe reservoir pressure equalized with the brake pipe at all times, should the said reservoir pressure leak down below the brake pipe pressure.

Air will leak around piston valve 30 so that there will be an equalization of pressures in chambers 29 and 29' on opposite sides of the valve 30.

In the main slide valve seat is a port 122 which is in communication through a passage 123, with the chamber 29 above the valve 30. In the main slide valve is a groove 121 for the purpose of venting chamber 29 to atmosphere in emergency applications, as will be hereinafter described.

Brake pipe air will also flow from the brake pipe connection 1, through passage 115 and port 116 into the emergency piston chamber 98 at the outer side of the said piston and will force said piston inwardly to the limit of its movement, as shown in Fig. 11. Brake pipe air also flows from passage 43 through passage 53 past check valve 54 into the release-governing valve chamber 15ᵇ. From this chamber it flows through the open port 61 through passage 124 to port 24 in the main slide valve seat and thence into the main slide valve chamber 14. A check valve 52 is provided to prevent the pressure thus admitted to chamber 14 from flowing to the emergency reservoir through passages 51 and 46 during the charging process. If it is desired to slowly charge the emergency reservoir during the time the brake pipe reservoir is being charged, a small orifice or by-pass around check valve 52 may be provided. From chamber 14 the air will flow through the open passage 117, into the emergency valve chamber 102. This flow of brake pipe air to chambers 14 and 102 will be only during the initial charging of the apparatus. When fully charged, emergency reservoir air is in these two chambers at all times.

During the charging of the apparatus, brake pipe reservoir air will flow through passages 125 and 126 to port 127 in the emergency valve seat. Port 127 is in communication through groove 128 with the operating slot 103 and the quick-action chamber 99, so that brake pipe reservoir air will flow through said ports and passages into the quick-action chamber and thence through port 114 and passage 118 to the pipe connection 5 and thence to the quick-action reservoir F. Air also flows from the emergency piston chamber through port 93ᵃ, and connecting passage 93 into the actuating chamber 65 of the pilot valve section, forcing downwardly the diphragms and moving the pilot valve 80 to release position, thereby closing port 87 which is connected by passages 88 and 125 with the brake pipe reservoir. The port 89 of the pilot valve seat, which is connected through passage 90 to the equalizing chamber 69, is connected by groove 81 of the pilot valve to the exhaust port 91, so that the equalizing chamber is vented to atmosphere. As hereinbefore pointed out, this equalizing chamber is connected through passage 92 with the brake cylinder control chamber 21, so that said chamber is also vented to atmosphere through the equalizing chamber and the pilot valve. Brake pipe reservoir air also flows from the reservoir connection, and passage 49 past check valve 57, through passage 56, to brake pipe reservoir port 25 in the main slide valve seat. In the charging and release position of the main slide valve, as shown in Figs. 2 and 3, this port is closed.

With the release governing valve in graduated release position, as shown in the diagrammatic view, Fig. 2, emergency reservoir air will flow from passage 46 through passage 129 to port 130 in the release governing valve seat. This port is in communication with a groove 131 in the release governing valve and said groove is in communication with the port 96 of the release governing valve seat. From port 96 as has been previously described, passage 95 leads to the emergency reservoir chamber 73 below the emergency diaphragm 71 of the pilot valve. Emergency reservoir air flows from the emergency reservoir connection 4, through passage 46, passage 51, past check valve 52, into the main slide valve chamber 14, so that when the apparatus is fully charged, emergency reservoir pressure will be in chamber 14, and through passage 117 will flow to emergency valve chamber 102. When the main slide valve is in release position, as shown in Figs. 3, 25 and 25ᵃ, emergency reservoir air will flow through port 24, passage 124 and port 61 to the release-governing valve chamber 15ᵇ.

With the release governing valve in quick-release position, as shown in Fig. 30, passage 95 leading from the emergency reservoir chamber 73 of the pilot valve section will be connected by groove 131, port 134 in the release-governing valve, to port 135 of the release governing valve seat, this latter port being connected by passage 136 to port 137 of the emergency valve seat 100. With the emergency valve in charging position, as shown in Figs. 2, 11, 31 and 31ᵃ, groove 138 is in communication with port 137 and connects said port with exhaust port 139. The result of these connections is that the emergency reservoir chamber 73 will be vented to atmosphere during the charging operation with the release-governing valve in quick-release position.

When the release-governing valve is placed in quick-release position, port 140 of the release-governing valve seat will be uncovered and said port is connected by passage 141 to chamber 38 below the charging valve 39, so that when the charging valve is raised during the charging operation brake pipe air may flow directly from chamber 42, through passage 141, into the release-governing valve chamber 15ᵇ. When the release-governing valve is in graduated-release position, port 140 is closed.

Service application position.

(See Figs. 21, 22, 26, 26ᵃ, 32 and 32ᵃ.)

The service application position of the triple valve will be first described with the release governing valve adjusted for graduated-release operation. To effect a service application of the brakes, the brake pipe pressure is reduced the desired amount in the usual way through the engineer's brake valve. This results in a corresponding reduction of pressure in chamber 98 of the emergency valve, said chamber being connected to the brake pipe through port 116 and passage 115. Brake pipe reservoir pressure and quick action reservoir pressure in quick-action chamber 99 will force the emergency piston 108 outwardly until it engages the spring pressed plunger 105 slightly compressing the spring. This uncovers the leakage groove 111 and permits quick-action chamber and quick-action reservoir pressures to reduce with the brake pipe. The actuating chamber 65 is connected to the emergency piston chamber by passage 93 and port 93ᵃ, so that the pressure in the actuating chamber will be lowered with the pressure in the brake pipe. With the emergency valve in service-application position, as shown in Figs. 21, 22 and 32, brake pipe reservoir port 127 is cut off from the quick-action chamber, and port 137 is disconnected from port 139 and placed in communication with the emergency valve chamber 102 through the groove and port 142 to permit emergency reservoir pressure to flow from said chamber 102 into said port 137 and the connected passage 136.

With the release-governing valve in graduated release position, as shown in Figs. 21 and 29, passage 136 and its port 135 is closed by the said release-governing valve. With the release-governing valve in quick-release position, as shown in Figs. 22 and 30, emergency reservoir air will flow into port 96, passage 95, to emergency reservoir chamber 73, in order to charge said chamber with emergency reservoir air. With the release-governing valve in graduated-release position, as heretofore described, emergency reservoir air is initially charged into chamber 73.

Emergency reservoir air in chamber 73 will force the diaphragms in the pilot valve structure upwardly, thereby moving the slide valve to the position shown in Fig. 21, in which position the pilot-valve groove 81 connects brake pipe reservoir port and passage 87—88 with the equalizing reservoir port and passage 89—90. Brake pipe reservoir air will, therefore, flow into the equalizing chamber 69 and thence through passage 92 to the brake-cylinder control chamber 21 of the main slide valve section.

From chamber 21 air will flow into the volume chamber 26, so that the pressure will be equal at all times in the equalizing chamber 69, control chamber 21, and volume chamber 26. As the pressure builds up in chamber 21, the main piston 8 will be forced inwardly, that is to say, toward the left hand, as viewed in the drawings, until brake cylinder equalizing port 19 is uncovered. The piston rod 11 during this inward movement of the piston 8 will engage the spring pressed plunger 22 and move it against the tension of the spring 23. As soon as the piston 8 has been forced inwardly beyond the port 19, air will flow from the chamber 21 past the check valve 20 into the brake cylinder chamber 9 and, of course, into the piston chamber 7. The brake cylinder chamber 9 is in direct communication with the brake cylinder at all times. Port 19 is of smaller capacity than the ports of the pilot valve, and is so proportioned to said pilot valve ports that the piston 8 and the main slide valve 13 will stop and be held in service position. The piston rod 11 will engage the plunger 22 before the port 19 is uncovered by the piston 8, but the increasing pressure in chamber 21 will continue to move the piston 8 inwardly against the tension of the spring 23 until port 19 is uncovered and placed in communication with chamber 21. When said port is uncovered and pressure can flow from chamber 21 through said port and into chambers 9 and 7 the inward movement of the piston will be stopped with the slide valve in service position. This insures the arresting of the main slide valve in service position, it being manifest that if the pressure in chamber 21 were not relieved through the port 19 the piston 8 would continue its inward movement as the pressure in chamber 21 increased and the main slide valve would be moved to emergency position. The ports in the pilot valve and the port 19 are so proportioned that the piston 8 cannot be forced to emergency position by air supplied to chamber 21 through the pilot valve ports. The brake cylinder pressure accumulating in chambers 9 and 7 and the pressure of the spring 23 balances the accumulating pressure in chamber 21 and holds the main slide valve in service position so long as the pilot valve is in service position. The inward movement of the piston to service position will carry the main slide valve to the position shown in Figs. 26—26ª. In this position the brake pipe port 24 registers with a corresponding port 143 in the main slide valve and the brake pipe reservoir port 25 registers with a corresponding port 144 in the main slide valve. These two ports open into a passage 145 which communicates through a port 146 with the operating slot 10, so that brake pipe and brake pipe reservoir air, in the service position of the main slide valve, will flow together into the brake cylinder chamber 9, and from said chamber it will flow through passage 18 directly to the brake cylinder. The inward movement of the piston 8 and its stem carries the release valve 16 into position to close brake cylinder exhaust port 17.

Brake pipe reservoir air will continue to flow through the pilot valve and equalizing chamber 69 to the control chamber 21 until the pressure in chamber 69 has been built up sufficiently to compensate for the reduction of pressure in chamber 65. When the pressure in the equalizing chamber 69, plus the reduced pressure in the actuating chamber 65, is sufficient to balance the emergency reservoir pressure in chamber 73, the pilot valve 80 will be moved to lap position. This will cut off the supply of air to the equalizing chamber and to the control chamber 21. With the main service slide valve in service application position, air will continue to flow to the brake cylinder until there is an equalization of pressures on opposite sides of the piston 8, at which time the service lap spring 23 will move the main service slide valve to lap position, (Figs. 27—27ª), thereby partly closing the ports 24 and 25 and moving port 146 away from the operating slot 10. The pilot valve will be held in service position until the desired brake cylinder pressure has been built up in the equalizing chamber: So long as port 19 is open, air will continue to flow from the control chamber through port 19 to chambers 9 and 7 and to the brake cylinder. It is manifest, therefore, that the desired brake cylinder pressure will not be reached in the control chamber as long as port 19 is open, and port 19 will remain open until a sufficient pressure has been built up in chambers 9 and 7 to permit equalization diaphragm to operate the diaphragm section to lap position, it being understood that pressure necessary to lap the pilot valve cannot be maintained in chamber 21 until a sufficient amount has been built up in chambers 9 and 7. The lap spring 23 then can move the piston 8 and the main slide valve to lap position, thereby cutting off a further supply of air to the brake cylinder and also cutting off port 19 from communication with the control chamber. By properly proportioning the equalizing diaphragm 68 to the other diaphragm of the pilot valve mechanism, the desired pressure will be built up in the brake cylinder for any given reduction in brake pipe pressure.

Should there be a reduction of brake cylinder pressure, due to brake cylinder leakage, during the braking period, the pressure in the chamber 21 will force the piston 8 and the service-slide valve to service position uncovering port 19 and permitting air to flow from chamber 21 through port 19. This will permit the emergency reservoir pressure in chamber 73 to again move the pilot valve to service position and connect the brake pipe reservoir to the equalizing chamber. When the desired pressure has been again built up in the brake cylinder, the main service slide valve and the pilot valve will again move to lap position.

If it be desired to increase the brake cylinder pressure, a further reduction in brake pipe pressure is made. This will result in a further reduction of pressure in chamber 98 and a consequent further reduction in the actuating chamber 65 and also in quick action chamber through groove 111. The pilot valve will again go to service position and the pressure in the equalizing chamber and the control chamber 21 will be increased, resulting in the main service slide valve again going to service position and an increase in the brake cylinder pressure. The service slide valve will be moved to lap position again when the brake cylinder pressure is equal to pressure in the control chamber, and the pilot valve will go to lap position when the pressure in the equalizing chamber 69 has been built up to compensate for the further reduction in pressure in the actuating chamber 65.

It is manifest that by repeated reductions in brake pipe pressure, the brake cylinder pressure may be built up step by step to any desired pressure up to the full equalization of brake pipe, brake pipe reservoir, and brake cylinder. It is also manifest that brake cylinder pressure may be maintained by merely maintaining a predetermined brake-pipe pressure; and also that brake cylinder pressure will be uniform without regard to the length of the brake cylinder piston travel and without regard to brake cylinder leaks.

As hereinbefore pointed out, the chamber between equalizing diaphragm 68 and emergency diaphragm 71 is always open to atmosphere through opening 94.

During all service applications of the brakes, air flows from the brake pipe and the brake pipe reservoir directly to the brake cylinder, the brake pipe reservoir constituting merely a means for augmenting the brake pipe volume.

Graduated release.

(See Figs. 2—21—29.)

When it is desired to operate the brakes in graduated release, the release-governing valve 15 is moved inwardly to the position shown in Fig. 29, thereby placing the emergency reservoir in communication with the emergency chamber 73 of the pilot valve structure, so that when operating in graduated release, emergency reservoir pressure is always under the emergency diaphragm 71. With the release-governing valve in graduated release position, as indicated, and assuming the brakes to be applied and the valves in service lap position, an increase in brake pipe pressure will, of course, result in an increase of pressure in chamber 98 of the emergency valve, thereby forcing inwardly the piston 108 and moving the emergency valve 113 to release position (Figs. 31—31ª). This will permit brake pipe reservoir air to flow through port 127, groove 128, operating slot 103, into the quick-action chamber 99. From chamber 98 air will flow through port 93ª and passage 93 into the actuating chamber 65, thereby depressing the diaphragms and moving the pilot valve downwardly to release position, in which position groove 81 will connect port 89 to exhaust port 91. This will permit air to flow from the control chamber 21 and volume chamber 26 through the equalizing chamber 69 to atmosphere. The reduction of pressure in chambers 21 and 26 will permit the brake cylinder pressure, in brake cylinder chamber 9, to move the piston 8 and the main service slide valve and release valve 16 to release position, thereby opening port 17 to allow brake cylinder pressure to escape directly to atmosphere. Air will continue to flow from the control chamber 21, volume chamber 26, and equalizing chamber 69 until the pressure in chamber 69 has been reduced sufficiently to permit the emergency reservoir pressure in chamber 73 to overcome the reduced pressure in the equalizing chamber 69 and the increased pressure in the actuating chamber 65 whereupon the emergency reservoir pressure in chamber 73, will move the pilot valve to lap position. Air will continue to flow through the exhaust port 17 until the brake cylinder pressure has been reduced slightly below the pressure in the control chamber, at which time the superior pressure in the control chamber will move the piston 8 inwardly and close the exhaust port 17. During the release of brake cylinder pressure and the movement of the release valve 16 back to lap position, there will be no flow of air from the control chamber through the brake-cylinder equalizing port 19, as that port will not be in communication with the control chamber 21. It is only when the piston 8 is moved inwardly to application position that the port 19 is brought into communication with the control chamber 21.

During all movements of the main slide valve in service applications and release, an approximate equalization of pressures is maintained in chambers 29 and 29' by leakage around the vent valve 30, and said valve will not be unseated. The rising brake-pipe pressure will flow into chamber 42 and raise the charging valve to permit the increased brake pipe pressure to flow through feed grooves 44, into the brake-pipe reservoir charging passage 48, thereby recharging the brake-pipe reservoir.

If it be desired to further reduce brake cylinder pressure, the brake pipe pressure is again increased so that the brake cylinder pressure may be reduced step by step until it is wholly released. It is manifest, therefore, that brake-cylinder pressure may be gradually increased step by step or gradually reduced step by step.

By providing a control chamber and a volume chamber of predetermined capacity, the time required to obtain a release of the brakes is fixed without regard to the size of the brake cylinder. The air from the control and volume chambers can only be exhausted through the pilot-valve port, and as the control and volume chambers are of fixed capacity, the complete release of pressures from said chambers will take place in a fixed and predetermined time. The brake cylinder pressure can only be fully released by the full release of pressure from the control chamber and volume chamber. If the brake cylinder pressure in chamber 9 reduces more rapidly than in the control chamber 21, the piston 8 will be moved over to throttle or entirely close the exhaust port 17. When the triple valve is used with a small brake cylinder, the brake cylinder pressure in chamber 9 will reduce more rapidly when the valve is in release position, than when the triple valve is used with a brake cylinder of large capacity. The result will be that the pressure in the control chamber will have a tendency to hold back the release of pressure from a small brake cylinder; whereas when the triple valve is used in connection with a brake cylinder of large capacity, the pressure in chamber 9 will reduce at substantially the same rate as the pressure in chamber 21, so that the brake cylinder pressure from the large brake cylinder will be exhausted in about the same time as is required to exhaust the pressure from the control chamber through the pilot valve. The purpose of this arrangement is to obtain a uniform release of brake cylinder pressures throughout a train made up of equipments of large and small brake cylinders. The period of release, that is to say, the time required to secure the complete release of brake cylinder pressure, is governed by the size of the volume chamber 26, so that with volume chambers of uniform size or capacity, all the brakes in a train will go to full release in a predetermined time.

*Quick release.*

(See Figs. 22—23—24—30.)

When operating in quick release, the release governing valve is moved outwardly to the position shown in Fig. 30. In this position of the valve, the emergency reservoir chamber 73 of the pilot valve structure is connected by passage 95 and port 96 of the release governing valve, through groove 131, port and passage 134, to port 135 which leads through passage 136 to port 137 of the emergency valve seat. In the release position of the emergency valve, port 137 is connected by groove 138 to exhaust port 139. The result of this is that in the release position of the emergency valve, chamber 73 will be vented to atmosphere, that is to say, there will be no pressure in chamber 73, as hereinbefore pointed out, during the initial charging of the apparatus, and also while the emergency valve is in release position. With the release-governing valve thus adjusted for quick-release operations, a decrease in brake pipe pressure will result in the emergency valve moving to application position, as hereinbefore described, (see service application position), the port 142 of said valve connecting chamber 102 to port 137, as shown in Fig. 32ª. As emergency reservoir air is always maintained in chamber 102 through passage 117, emergency air will pass through port 142 into port and passage 137—136, and through port 135, the release-governing valve port 134 and port and passage 96—95 to the emergency reservoir chamber 73. This will raise the diaphragm structure against the reduced pressure in the actuating chamber and thereby move the pilot valve to application position. Before the emergency reservoir pressure is admitted to chamber 73, the brake pipe pressure in the actuating chamber 65 will hold the diaphragm structure in its lower position and the pilot valve in release position. When the pilot valve has been thus moved to service position, the operation of the parts takes place precisely as described in connection with the release-governing valve in graduated release position.

When it is desired to release the brakes, with the release governing valve in quick-release position, an increase of brake pipe pressure forces the emergency piston 108 inwardly to release position and groove 138 will connect port 137 to exhaust port 139. Chamber 73 is thereby immediately exhausted to atmosphere and the pressure in the actuating chamber 65 forces the diaphragm structure and the pilot valve to release position. This results in a venting to atmosphere of the control chamber 21, the volume chamber 26 and the equlizing chamber 69. As the pressure in the control chamber is reduced, the brake cylinder pressure moves the piston 8 and the release valve 16 to release position, thereby opening the exhaust port 17. The main slide valve 13 is also moved to release position, thereby uncovering the brake pipe port 24. Emergency reservoir pressure is in chamber 14 above the main slide valve and flows through port 24 to the release-governing valve chamber and from said chamber through port 140, which is open when the release-governing valve is in quick-release position, as shown in Figs. 24 and 30. From port 140 emergency reservoir air flows through passage 141 into the charging valve chamber 38 below the charging valve, lifting said valve to take the sealing flange 40 away from the gasket 41, thereby permitting the emergency reservoir air to flow directly into chamber 42. From chamber 42 this high pressure air will flow through passage 43 into chamber 29' below the vent valve 30, and thence directly into the brake pipe to quickly raise the brake pipe pressure. The increased brake pipe pressure will flow around valve 30 into the chamber 29, above the vent valve, and prevent said valve being unseated by the rising brake pipe pressure. The emergency reservoir air flowing into chamber 42 will lift the charging valve 39 to uncover the feed grooves 44 and close port 46 so that the high pressure air below the charging valve will flow around said valve and into the brake pipe reservoir.

The release of brake cylinder pressure takes place wholly through the brake cylinder release port 17 during all release operations of the triple valve, and the movement of the release valve 16 is wholly controlled by varying the air pressure in chamber 21 and, of course, in the volume chamber 26.

The emergency reservoir air will quickly equalize into the brake pipe, rapidly raising the brake pipe pressure. As each triple valve is moved to release position, the wave of increased brake pipe pressure will flow rapidly throughout the length of the train.

*Emergency position.*

(See Figs. 23—28—28ᵃ—33—33ᵃ.)

The emergency operation of the triple valve will be first described with the release-governing valve in position for quick release of the brakes.

An emergency operation of the triple valve is obtained by a sudden and prolonged reduction in brake pipe pressure. This results in a sudden reduction of pressure in chamber 98 of the emergency valve and in the actuating chamber 65. The pressure in the quick-action chamber 99 immediately forces the piston 108 into engagement with the sealing gasket 119, the superior pressure in the quick-action chamber forcing the piston against the gasket 119 and moving the spring pressed emergency plunger 105. When the emergency piston is in emergency position it seals port 93ᵃ and prevents further reduction of pressure in chamber 65. With the valve 113, in emergency position, an emergency port 147 will be uncovered and emergency reservoir air, which is in chamber 102, will flow through said port and through passage 148 to passage 92 which leads into the brake-cylinder control chamber 21. The emergency position of the emergency valve also permits emergency reservoir air to flow from chamber 102 through port 142 into port 137, and thence through passage 136 to port 135 of the release-governing valve seat, and thence through port 134 of said valve, port 96, and thence through passage 95 to the emergency reservoir chamber 73. In the emergency valve 113 there is formed a small equalizing port 149 which, in the emergency position of said valve, places chamber 102 in communication with the slot 103 and the quick-action chamber 99, so that there will be an equalization of pressures in said chambers. A small port 149ᵃ is formed in the emergency valve, and is so positioned that when said valve is in emergency position said port will register with a port 149ᵇ in the valve seat. This port 149ᵇ is connected by a passage 149ᶜ to the brake cylinder chamber 9, so that in emergency applications, emergency reservoir air will flow through port 149ᵃ to chamber 9 to maintain an equalization between the emergency reservoir and brake cylinder after main service slide valve has moved to emergency lap position.

The emergency reservoir air flowing into the control chamber 21, as described, will force the piston 8 inwardly to the limit of its movement, the stem 11 engaging the plunger 22 and compressing the lap spring 23. Air will flow through the port 19 into the brake cylinder chamber 9 and into the brake cylinder, but the capacity of the port 19 is less than the capacity of the passage 92, so that the piston will be maintained in its emergency position. In the emergency position of the main slide valve 13, shown in Figs. 28—28ᵃ, the brake pipe port 24 is closed. Brake pipe reservoir port 25 is in communication with an emergency groove 150 in the main slide valve, said groove placing the brake pipe reservoir port in communication with the brake cylinder chamber 9, through the operating slot 10. The main slide valve uncovers the operating slot 10 and places the chamber 9 in direct communication with the main slide valve chamber 14. As hereinbefore pointed out, the emergency reservoir is in direct communication with the chamber 14 through passage 51, so that emergency reservoir air will flow directly into said chamber 14, and thence directly into the brake cylinder chamber 9. From chamber 9 the air will flow directly through passage 18 to the brake cylinder connection 3. The check valve 57 will prevent emergency reservoir air flowing into the brake pipe reservoir; but if the brake pipe reservoir pressure is superior to the equalized emergency reservoir and brake cylinder pressure, air may flow past the check valve 57 to the brake cylinder chamber, thereby augmenting the brake cylinder pressure.

In emergency applications the operation of the pilot valve is an idle operation, that is to say, the main slide valve and the emergency valve will go to their emergency positions and the brakes will be applied regardless of the operation of the pilot valve. When the emergency valve goes to emergency position port 148 in the emergency valve seat is open and emergency air will flow from chamber 102 through port 148, passage 92 to the control chamber 21. As the brake cylinder chamber 9 is open to atmosphere through exhaust port 17, the main slide valve will be immediately forced inwardly to emergency position. When the piston 8 has passed port 19, air will flow through said port from chamber 21 through passage 18 into the brake cylinder chamber 9. This will to some extent relieve the pressure in the control chamber. Emergency air will also flow through passage 92 into the equalizing chamber 69 and from said chamber it will flow through passage 90, groove 81 of the pilot valve to exhaust port 91. When an emergency application takes place pressures in chambers 65—69 and 73 will be equalized. Pilot valve will then very slowly reduce the brake cylinder pressure through chamber 69, so that at time of release the brake cylinder pressure will be reduced sufficiently to insure a positive release of the brakes. Emergency air will also flow through port 142, port and passage 137—136, through the release governing valve and thence through passage 95 to the emergency reservoir chamber 73. The pressure building up in the equalizing chamber 69 and operating on the larger diaphragm 71 will oppose the pressure in chamber 73 and will be sufficient to prevent the pressure in chamber 73 moving the pilot valve immediately to lap or service position. When the main service slide valve is in emergency position, the emergency reservoir is in direct communication with the brake cylinder and there will be, almost immediately, an equalization of emergency reservoir, brake pipe reservoir and brake cylinder pressures. When an emergency application takes place after a service application, check valve 57 will prevent the high emergency reservoir pressure from flowing to the reduced brake pipe reservoir pressure, thus permitting the high emergency reservoir pressure to equalize with the brake cylinder.

The release of air from the equalizing chamber through the pilot valve at the inception of the emergency operation will not in any way affect the full emergency application of the brakes because the emergency reservoir is then in direct communication with the control chamber and the equalizing chamber and the reduction of pressure in the control chamber by exhaust through the pilot valve will be very slow due to the large volume of air which is being drawn upon.

Any increase in pressure in the brake cylinder chamber 9, due to a flow of air from the brake pipe reservoir, will be immediately communicated to chamber 14, and thence through the port and passage 117, to the emergency valve chamber 102. From this chamber the increased pressure will be distributed to the quick-action chamber and also to the control chamber 21, (148—92), and the equalizing chamber 69, (148—92). This increased pressure will also flow to chamber 73 from the emergency valve chamber 102 through the release-governing valve. It is, therefore, manifest, that should the brake cylinder pressure be augmented by the brake pipe reservoir air, said increased pressure will be balanced throughout the triple valve.

With the main slide valve in emergency position, the groove 121 in the main slide valve will connect port 122 of the main slide valve seat with an exhaust port 151, and thereby vent directly to atmosphere chamber 29 above the emergency vent valve 30. The result of this will be that brake pipe pressure below said valve will move said valve upwardly and open the brake pipe directly to atmosphere through the large exhaust port 35. Chamber 42 will be exhausted to atmosphere and brake pipe reservoir air above charging valve 39 will hold said valve to its seat, thereby sealing brake pipe reservoir and preventing any escape of air from said reservoir to atmosphere.

When there has been an equalization of pressures on opposite sides of the actuating piston 8, the spring 23 will move the main service slide valve to lap position, as shown in Fig. 27. This position is the same in emergency and service applications.

With the release governing valve in graduated release position, the emergency operation is precisely the same as that just described, wherein the release-governing valve is described as in quick-release position, except that emergency reservoir air is at all times in chamber 73 and the pilot valve will go to service position, whereas with the release-governing valve in quick-release position the flow of emergency reservoir air to and from chamber 73 is dependent upon the movement of the emergency valve and the pilot valve will for a time remain in release position.

The release of the brakes is effected after an emergency application, precisely as hereinbefore described, due to the increase of brake pipe pressure in chamber 98 of the emergency valve which will force the emergency piston 108 inwardly and place the emergency valve in release position. Brake pipe air will also flow directly into chamber 65 from chamber 98 when the port 93$^a$ is uncovered by the inward movement of the piston 108.

What I claim is:

1. A triple valve for air brake apparatus, comprising a main service slide valve adapted in service application position to connect a brake pipe and a brake pipe reservoir to a brake cylinder for a service application of the brakes by brake pipe pressure, a main actuating piston for said valve subject on one side to brake cylinder pressure, a control chamber the air therein operating on the main piston in opposition to the brake cylinder pressure, and valve means operated by variations in brake pipe pressure to admit a predetermined pressure to the control chamber to move the main piston and the service slide valve to application position, and means to move said slide valve to lap position when the brake cylinder pressure operating on the main actuating piston is substantially equal to the established pressure in the control chamber.

2. A triple valve for air brake apparatus, comprising a main service slide valve adapted in service application position to connect a brake pipe and a brake pipe reservoir to a brake cylinder for a service application of the brakes by brake pipe pressure and adapted in emergency application position to connect an emergency reservoir and the brake pipe reservoir to the brake cylinder for an emergency application of the brakes, a main actuating piston for said valve subject on one side to brake cylinder pressure, a control chamber the air therein operating on the main piston in opposition to the brake cylinder pressure, valve means operated by variations in brake pipe pressure to admit a predetermined pressure to the control chamber to move the main piston and the service slide valve to application position, and means to move said slide valve to lap position when the brake cylinder pressure operating on the main actuating piston is substantially equal to the established pressure in the control chamber.

3. A triple valve for air brake apparatus, comprising a main service slide valve adapted in service application position to connect a brake pipe and a brake pipe reservoir to a brake cylinder for a service application of the brakes by brake pipe pressure and adapted in emergency application position to connect an emergency reservoir and the brake pipe reservoir to the brake cylinder for an emergency application of the brakes, a main actuating piston for said valve subject on one side to brake cylinder pressure, a control chamber the air therein operating on the main piston in opposition to the brake cylinder pressure, valve means operated by variations in brake pipe pressure to admit a predetermined pressure to the control chamber to move the main piston and the service slide valve to application position, means to move said slide valve to lap position when the brake cylinder pressure operating on the main actuating piston is substantially equal to the established pressure in the control chamber, and means operating upon a sudden reduction in brake pipe pressure to connect the emergency reservoir with the control chamber.

4. A triple valve for air brake apparatus, comprising a main service slide valve adapted in service application position to connect a brake pipe and a brake pipe reservoir to a brake cylinder for a service application of the brakes by brake pipe pressure and adapted in emergency application position to connect an emergency reservoir and the brake pipe reservoir to the brake cylinder for an emergency application of the brakes, a main actuating piston for said valve subject on one side to brake cylinder pressure, a control chamber, the air therein operating on the main piston in opposition to the brake cylinder pressure, valve means operating upon a slow reduction of brake pipe pressure to connect the brake pipe to the control chamber for a service application of the brakes, and operating upon a sudden reduction in brake pipe pressure to connect the emergency reservoir with the control chamber for an emergency application of the brakes, and means to move said slide valve to lap position when the brake cylinder pressure operating on the main actuating piston is substantially equal to the established pressure in the control chamber.

5. A triple valve for air brake apparatus, comprising a main service slide valve adapted in service application position to connect a brake pipe and a brake pipe reservoir to a brake cylinder for a service application of the brakes by brake pipe pressure and adapted in emergency application position to connect an emergency reservoir and the brake pipe reservoir to the brake cylinder for an emergency application of the brakes, a main actuating piston for said valve subject on one side to brake cylinder pressure, a control chamber the air therein operating on the main piston in opposition to the brake cylinder pressure, valve means operated by variations in brake pipe pressure to admit a predetermined pressure to the control chamber to move the main piston and the service slide valve to application position, means to move said slide valve to lap position when the brake cylinder pressure operating on the main actuating piston is substantially equal to the established pressure in the control chamber, and an emergency valve operated by variations in pressure in the brake pipe for controlling the operation of the said valve means.

6. A triple valve for air brake apparatus, comprising a main service slide valve adapted in service application position to connect a brake pipe and a brake pipe reservoir to the brake cylinder for a service application of the brakes by brake pipe pressure and adapted in emergency application position to connect an emergency reservoir and the brake pipe reservoir to the brake cylinder for an emergency application of the brakes, a main actuating piston for said valve subject on one side to brake cylinder pressure, a control chamber, the air therein operating on the main piston in opposition to the brake cylinder pressure, a pilot valve operated by variations in brake pipe pressure to admit a predetermined pressure to the control chamber to move the main piston and the service slide valve to application position, and means to move said slide valve to lap position when the brake cylinder pressure operating on the main actuating piston is substantially equal to the established pressure in the control chamber, and an emergency valve operated by variations in brake pipe pressure and controlling the operation of the pilot valve.

7. A triple valve for air brake apparatus, comprising a main service slide valve controlling the admission of air to the brake cylinder, a main actuating piston for said valve subject on one side to brake cylinder pressure, a control chamber the air therein operating on the main piston in opposition to brake cylinder pressure, and a pilot valve subject to brake pipe and emergency reservoir pressures and the pressure in the control chamber, and operating upon a reduction of brake pipe pressure to establish a predetermined pressure in the control chamber, the pilot valve being moved to lap position by said predetermined pressure and the pressure in the control chamber moving the main slide valve to application position, the brake cylinder pressure permitting said main service slide valve to move to lap position when it equals the pressure established in the control chamber, the pilot valve operating upon an increase of brake pipe pressure to exhaust pressure from the control chamber and thereby permit the brake cylinder pressure to move the slide valve to release position.

8. An air brake apparatus comprising a brake pipe, a brake pipe reservoir, an emergency reservoir, a brake cylinder, and a triple valve embodying a main service slide valve adapted in service application position to connect the brake pipe and the brake pipe reservoir to the brake cylinder and in emergency application position to cut off the brake pipe and connect the emergency reservoir and the brake pipe reservoir to the brake cylinder, a main actuating piston for said main valve operating in a piston chamber and subject normally to atmospheric pressure, a control chamber connected to the piston chamber, a pilot valve subject to brake pipe and emergency reservoir pressures and to the pressure in the control chamber and operating upon a reduction of brake pipe pressure to establish a predetermined pressure in the control chamber, the pilot valve being moved to lap position by said predetermined pressure, the pressure in the control chamber moving the main slide valve to application position, a connection between the brake cylinder and piston chamber whereby the main slide valve will be moved to lap position when the brake cylinder pressure equals the pressure in the control chamber, and means operated by an increase of brake pipe pressure to cause the pilot valve to exhaust pressure from the control chamber and thereby permit the brake cylinder pressure to move the main slide valve to release position.

9. An air brake apparatus comprising a brake pipe, a brake pipe reservoir, an emergency reservoir, a brake cylinder, and a triple valve embodying a main service slide valve adapted in service application position to connect the brake pipe and the brake pipe reservoir to the brake cylinder and in emergency application position to cut off the brake pipe and connect the emergency reservoir and the brake pipe reservoir to the brake cylinder, a main actuating piston for said main valve operating in a piston chamber and subject normally to atmospheric pressure, a control chamber connected to the piston chamber, a pilot valve subject to brake pipe and emergency reservoir pressures and to the pressure in the control chamber and operating upon a reduction of brake pipe pressure to establish a predetermined pressure in the control chamber, the pilot valve being moved to lap position by said predetermined pressure, the pressure in the control chamber moving the main slide valve to application position, a connection between the brake cylinder and piston chamber whereby the main slide valve will be moved to lap position when the brake cylinder pressure equals the pressure in the control chamber, means operated by an increase of brake pipe pressure to cause the pilot valve to exhaust pressure from the control chamber and thereby permit the brake cylinder pressure to move the main slide valve to release position, and an emergency valve operated by variations in brake pipe pressure and controlling the operation of the pilot valve.

10. A triple valve for air brake apparatus comprising a main slide valve, an actuating piston therefor, a control chamber, a pilot valve, a pilot valve operating structure having three diaphragms spaced apart to form an actuating chamber, an equalizing chamber and an emergency reservoir chamber, means connecting said diaphragms to the pilot valve whereby the said valve will be moved by variations of pressures in said chambers, an emergency valve adapted to be operated by variations in brake pipe pressure and controlling the pressure in the actuating chamber of the pilot valve, means whereby the pilot valve in application position will admit air under pressure to the equalizing chamber, and means connecting the equalizing chamber to the control chamber.

11. A triple valve for air brake apparatus, comprising a main slide valve, an actuating piston therefor, a control chamber, a pilot valve, a pilot valve operating structure having three diaphragms spaced apart to form an actuating chamber, an equalizing chamber and an emergency reservoir chamber, means connecting said diaphragms to the pilot valve whereby the said valve will be moved by variations of pressures in said chambers, an emergency valve adapted to operate upon a reduction in brake pipe pressure to reduce the pressure in the actuating chamber of the pilot valve and thereby cause the pilot valve to move to application position, means whereby the pilot valve in application position will admit air under pressure to the equalizing chamber, and means connecting the equalizing chamber to the control chamber.

12. A triple valve for air brake apparatus, comprising a main slide valve, an actuating piston therefor, a control chamber, a pilot valve, a pilot valve operating structure for moving said pilot valve and having three diaphragms spaced apart to form an actuating chamber, an equalizing chamber and an emergency reservoir chamber, means connecting said diaphragms to the pilot valve whereby the said valve will be moved by variations of pressures in said chambers, an emergency valve adapted to be operated by variations in brake pipe pressure and controlling the pressure in the actuating chamber of the pilot valve, means whereby the pilot valve in application position will admit air under pressure to the equalizing chamber, means connecting the equalizing chamber to the control chamber, and means for maintaining emergency reservoir pressure in the emergency reservoir chamber of the pilot valve structure.

13. A triple valve for air brake apparatus comprising a main slide valve, an actuating piston therefor, a control chamber, a pilot valve, a pilot valve operating structure having three diaphragms spaced apart to form an actuating chamber, an equalizing chamber, and an emergency reservoir chamber, means connecting said diaphragms to the pilot valve whereby the said valve will be moved by variations of pressures in said chambers, and an emergency valve adapted to be operated by variations in brake pipe pressure and adapted to operate upon a reduction of brake pipe pressure to place the actuating chamber in communication with the brake pipe to thereby reduce the pressure in the actuating chamber and operating to emergency position upon a sudden reduction in brake pipe pressure to connect the emergency reservoir to the actuating chamber and to the control chamber.

14. A triple valve in accordance with claim 12, provided with a release governing valve which when in graduated release position connects the emeregency reservoir to the emergency-reservoir chamber of the pilot valve structure and which in its quick-release position connects the emergency-reservoir chamber of the pilot valve structure to a port in the emergency valve seat, whereby the said emergency-reservoir chamber of the pilot valve structure will be vented to atmosphere through the release governing valve and the emergency valve when the emergency valve is in release position.

15. A triple valve in accordance with claim 12, provided with a release governing valve which when in graduated-release position connects the emergency reservoir to the emergency reservoir chamber of the pilot valve structure and which in its quick-release position connects the emergency reservoir chamber of the pilot valve structure to a port in the emergency valve seat, whereby the said emergency reservoir chamber will be vented to atmosphere through the release governing valve and the emergency valve when the emergency valve is in release position, and means whereby when the emergency valve moves to application position emergency reservoir air will flow to the emergency reservoir chamber of the pilot valve structure through the release-governing valve when said valve is in graduated release position.

16. An air brake apparatus comprising a brake pipe, a brake pipe reservoir, an emergency reservoir, a brake cylinder, and a triple valve embodying a main service slide valve adapted in service-application position to connect the brake pipe and the brake pipe reservoir to the brake cylinder and in emergency-application position to cut off the brake pipe and connect the emergency reservoir and the brake pipe reservoir to the brake cylinder, a main actuating piston for said main valve operating in a piston chamber and subject normally to atmospheric pressure, a control chamber connected to the piston chamber, a pilot valve subject to brake pipe and emergency reservoir pressures and to the pressure in the control chamber and operating upon a reduction of brake pipe pressure to establish a predetermined pressure in the control chamber, the pilot valve being moved to lap position by said predetermined pressure, the pressure in the control chamber moving the main slide valve to application position, a connection between the brake cylinder and piston chamber whereby the main slide valve will be moved to lap position when the brake-cylinder pressure equals the pressure in the control chamber, means operated by an increase of brake-pipe pressure to cause the pilot valve to exhaust pressure from the control chamber and thereby permit the brake-cylinder pressure to move the main slide valve to release position, and an emergency valve controlling the pilot valve and operating upon a sudden reduction in brake-pipe pressure to connect the emergency reservoir to the control chamber, the actuating chamber, and the emergency reservoir chamber of the pilot valve structure.

17. An air brake apparatus in accordance with claim 16 and provided with an emergency vent valve normally closed, and means controlled by the main slide valve upon a sudden reduction in brake pipe pressure to open said vent valve to vent the brake pipe to atmosphere.

18. A triple valve in accordance with claim 2 and provided with a charging valve controlling the charging of the brake pipe reservoir and emergency reservoir and operating upon an increase of brake pipe pressure to open communication between the brake pipe and brake pipe reservoir and close communication to the emergency reservoir, and means operating upon an equalization of pressures in the brake pipe reservoir and brake pipe to move the charging valve to open communication between the brake pipe reservoir and the emergency reservoir, said means also operating to move the valve to closed position upon an equalization of pressures in said reservoirs and the brake pipe.

19. A triple valve for air brake apparatus comprising a slide valve mechanism controlling the admission of air to the brake cylinder and the exhaust of air from the brake cylinder, an actuating piston for said mechanism subject on one side to brake cylinder pressure, a control chamber the air therein operating on the said piston in opposition to brake cylinder pressure, a pilot valve operating upon a reduction of brake pipe pressure to establish in the control chamber a predetermined pressure dependent upon the extent of the brake pipe reduction, means whereby the pilot valve will be moved by said predetermined pressure to lap position, the pressure established in the control chamber moving the slide valve mechanism to application position and the brake cylinder pressure permitting the slide valve mechanism to move to lap position when said pressure equals the pressure established in the control chamber, and means whereby the pilot valve upon an increase in brake pipe pressure will exhaust pressure from the control chamber and thereby permit the brake cylinder pressure to move the slide valve mechanism to release position.

20. A triple valve for air brake apparatus comprising a slide valve device controlling the admission of air to the brake cylinder and the exhaust of air from the brake cylinder, an actuating piston for said valve device subject on one side to brake cylinder pressure, a control chamber the air therein operating on the main piston in opposition to brake cylinder pressure, and a pilot valve operating upon a reduction of brake pipe pressure to connect the brake pipe pressure to the control chamber to establish in said chamber a predetermined pressure dependent upon the extent of the brake pipe reduction, the pilot valve being moved by said predetermined pressure to lap position and the pressure established in the control chamber moving the slide valve device to application position, the brake cylinder pressure permitting the main service slide valve to move to lap position when said pressure equals the pressure established in the control chamber, the pilot valve operating upon an increase in brake pipe pressure to exhaust pressure from the control chamber and thereby permit the brake cylinder pressure to move the main slide valve to release position.

21. A triple valve for air brake apparatus comprising a slide valve device controlling the admission of air to the brake cylinder and the exhaust of air from the brake cylinder, an actuating piston for said valve device, means operating upon a reduction of brake pipe pressure to establish a pressure on one side of said actuating piston in proportion to the brake pipe reduction to thereby move the slide valve device to application position to admit air to the brake cylinder, and means whereby the brake cylinder pressure will operate on the actuating piston in opposition to the pressure moving the slide valve device to application position.

22. A triple valve for air brake apparatus comprising a slide valve device controlling the admission of air to the brake cylinder and the exhaust of air from the brake cylinder, and means operating upon a reduction of brake pipe pressure to admit air to said slide valve device to move it to application position said means operating upon an increase in brake pipe pressure to permit the brake cylinder pressure to move the said slide valve device to release position.

In testimony whereof I hereunto affix my signature.

SPENCER G. NEAL.